(12) United States Patent
Hartness et al.

(10) Patent No.: US 7,185,753 B2
(45) Date of Patent: Mar. 6, 2007

(54) SHUTTLE CONVEYOR

(75) Inventors: Thomas P. Hartness, Greenville, SC (US); Olivier Duterte, Greer, SC (US)

(73) Assignee: Hartness International, Inc., Greenville, SC (US)

( * ) Notice: Subject to any disclaimer, the term of this patent is extended or adjusted under 35 U.S.C. 154(b) by 154 days.

(21) Appl. No.: 10/953,511

(22) Filed: Sep. 28, 2004

(65) Prior Publication Data

US 2006/0070850 A1 Apr. 6, 2006

(51) Int. Cl.
*B65G 29/00* (2006.01)
(52) U.S. Cl. ............................ 198/474.1; 198/803.7; 198/867.05
(58) Field of Classification Search ........... 198/468.01, 198/468.2, 468.3, 474.1, 466.1, 867.05, 867.15, 198/803.7
See application file for complete search history.

(56) References Cited

U.S. PATENT DOCUMENTS

| 766,329 | A | 8/1904 | Cunning |
|---|---|---|---|
| 1,058,096 | A | 4/1913 | Phelps |
| 1,073,067 | A | 9/1913 | Ayars |
| 1,883,007 | A | 10/1932 | Sheel |
| 1,892,463 | A | 12/1932 | Gray |
| 2,258,717 | A | 10/1941 | Read |
| 2,270,709 | A | 1/1942 | Pittaluga |
| 2,611,524 | A | 9/1952 | Taylor |
| 2,666,564 | A | 1/1954 | Minard |
| 2,723,790 | A | 11/1955 | Spiess, Jr. et al. |
| 2,766,635 | A | 10/1956 | Schwarzkopf |
| 3,028,713 | A | 4/1962 | Kennedy et al. |
| 3,067,863 | A | 12/1962 | Schwinger |
| 3,125,370 | A | 3/1964 | McGill |
| 3,168,123 | A | 2/1965 | Pellerino et al. |
| 3,308,928 | A | 3/1967 | Mosterd |
| 3,519,108 | A | 7/1970 | Webb et al. |

(Continued)

FOREIGN PATENT DOCUMENTS

DE 2153078 10/1971

(Continued)

OTHER PUBLICATIONS

U.S. Appl. No. 10/712,407, filed Nov. 13, 2003.

(Continued)

*Primary Examiner*—James R. Bidwell
(74) *Attorney, Agent, or Firm*—Dority & Manning, P.A.

(57) ABSTRACT

Various shuttle conveyor designs are disclosed. The conveyors are suitable for conveying objects along a transport direction. The shuttle conveyors may include a track extending along a conveying path, the track defining a length, and a plurality of shuttle elements independently movable along the track. Each shuttle element may define mating structure for following the track along the conveying path. Each shuttle element may include at least one movable gripping member for selectively gripping conveyed objects. The shuttle elements may define a collective length less than the length of the track. A drive mechanism moves the shuttle elements along the track. The shuttle elements may include a plurality of links. The shuttle elements may be driven faster on at least a portion of a return portion of the track than on the conveying portion of the track, and the shuttle element flow along the track may be modulated in various ways.

47 Claims, 18 Drawing Sheets

U.S. PATENT DOCUMENTS

| | | |
|---|---|---|
| 3,590,982 A | 7/1971 | Banyas |
| 3,608,700 A | 9/1971 | Nilsson |
| 3,664,491 A | 5/1972 | Scanlon et al. |
| 3,703,954 A | 11/1972 | Gudmestad |
| 3,742,989 A | 7/1973 | Campbell et al. |
| 3,747,737 A * | 7/1973 | Brooke .................... 198/803.7 |
| 3,754,637 A | 8/1973 | Carter et al. |
| 3,777,877 A | 12/1973 | Piper |
| 3,794,315 A | 2/1974 | Kaneko et al. |
| 3,818,785 A | 6/1974 | Wakabayashi |
| 3,826,293 A | 7/1974 | Cayton |
| 3,854,574 A | 12/1974 | Theijsmeijer et al. |
| 3,858,709 A | 1/1975 | Banyas et al. |
| 3,860,104 A | 1/1975 | Strauss |
| 3,881,592 A | 5/1975 | Stimpson |
| 3,910,404 A | 10/1975 | Henrekson |
| 3,944,058 A | 3/1976 | Strauss |
| 3,949,859 A | 4/1976 | Nussbaumer et al. |
| 3,990,209 A | 11/1976 | Eisenberg |
| 3,992,766 A | 11/1976 | Field |
| 4,018,325 A | 4/1977 | Rejsa |
| 4,033,862 A | 7/1977 | Spencer et al. |
| 4,053,003 A | 10/1977 | Ferrero et al. |
| 4,064,987 A | 12/1977 | Rowan |
| 4,068,882 A | 1/1978 | Van der Schoot |
| 4,096,939 A | 6/1978 | Riggs et al. |
| 4,106,612 A | 8/1978 | Koerner |
| 4,126,163 A | 11/1978 | Hartness et al. |
| 4,159,608 A | 7/1979 | Masuda et al. |
| 4,159,762 A | 7/1979 | Bulwith |
| 4,166,527 A * | 9/1979 | Beezer .................... 198/468.2 |
| 4,171,738 A | 10/1979 | Lieberman |
| 4,172,514 A | 10/1979 | Shantz et al. |
| 4,183,428 A | 1/1980 | McGill et al. |
| 4,208,852 A | 6/1980 | Pioch |
| 4,257,727 A | 3/1981 | Peyton |
| 4,287,980 A | 9/1981 | Montferme |
| 4,291,733 A | 9/1981 | Polderman |
| 4,335,761 A | 6/1982 | Peronek |
| 4,467,847 A | 8/1984 | Zodrow |
| 4,502,587 A | 3/1985 | Clark |
| 4,513,858 A | 4/1985 | Fellner et al. |
| 4,522,238 A | 6/1985 | Minard |
| 4,524,865 A | 6/1985 | Von Hofen |
| 4,530,433 A | 7/1985 | Cucchetto |
| 4,532,968 A | 8/1985 | Leonard |
| 4,533,038 A | 8/1985 | Richard |
| 4,567,919 A | 2/1986 | Fogg et al. |
| 4,588,001 A | 5/1986 | Leonard |
| 4,638,906 A | 1/1987 | Winiasz |
| 4,678,077 A | 7/1987 | Bertorello |
| 4,697,691 A | 10/1987 | Zodrow et al. |
| 4,745,007 A | 5/1988 | Houseman |
| 4,790,421 A | 12/1988 | Gorges |
| 4,793,261 A | 12/1988 | Schwaemmle |
| 4,807,421 A | 2/1989 | Araki et al. |
| 4,817,780 A | 4/1989 | Davidsson |
| 4,823,934 A | 4/1989 | Lemaire et al. |
| 4,835,946 A | 6/1989 | Hartness et al. |
| 4,856,144 A | 8/1989 | de Greef |
| 4,878,577 A | 11/1989 | Romero Lledo et al. |
| 4,901,844 A | 2/1990 | Palmaer et al. |
| 4,921,294 A | 5/1990 | Klopfenstein |
| 4,925,013 A | 5/1990 | Lapeyre |
| 4,934,517 A | 6/1990 | Lapeyre |
| 4,936,072 A | 6/1990 | Creed et al. |
| 4,953,687 A | 9/1990 | Gazzarrini |
| 5,004,097 A | 4/1991 | Roinestad et al. |
| 5,029,695 A | 7/1991 | Kovara |
| 5,035,270 A | 7/1991 | Herzog |
| 5,052,166 A | 10/1991 | Ziegler et al. |
| 5,072,573 A | 12/1991 | Tisma |
| 5,074,103 A | 12/1991 | McDowell |
| 5,115,901 A | 5/1992 | Santandrea et al. |
| 5,127,514 A | 7/1992 | Guttinger et al. |
| 5,170,546 A | 12/1992 | Harris |
| 5,219,065 A | 6/1993 | Hodlewsky et al. |
| 5,285,884 A | 2/1994 | Polling et al. |
| 5,295,523 A | 3/1994 | Gentile |
| 5,392,896 A | 2/1995 | Martelli |
| 5,395,151 A | 3/1995 | Eberle |
| 5,400,894 A | 3/1995 | Smith |
| 5,427,227 A | 6/1995 | Crandall et al. |
| 5,429,227 A | 7/1995 | Krössmann et al. |
| 5,452,568 A | 9/1995 | Tisma |
| 5,477,659 A | 12/1995 | Conrad et al. |
| 5,487,461 A | 1/1996 | Focke et al. |
| 5,497,887 A | 3/1996 | Hiebert |
| 5,509,524 A | 4/1996 | Ohmori et al. |
| 5,522,439 A | 6/1996 | Håkansson et al. |
| 5,581,975 A | 12/1996 | Trebbi et al. |
| 5,595,221 A | 1/1997 | Lagneau |
| 5,603,399 A | 2/1997 | Mannlein |
| 5,611,418 A | 3/1997 | Helmstetter |
| 5,620,084 A | 4/1997 | Mensch |
| 5,642,604 A | 7/1997 | Müller |
| 5,657,615 A | 8/1997 | Muller |
| 5,693,113 A | 12/1997 | Dries et al. |
| 5,697,490 A | 12/1997 | Raque |
| 5,722,655 A | 3/1998 | Reist |
| 5,768,860 A | 6/1998 | Weaver |
| 5,775,067 A | 7/1998 | Hawley |
| 5,778,634 A | 7/1998 | Weaver et al. |
| 5,791,453 A | 8/1998 | Schmits et al. |
| 5,810,151 A | 9/1998 | Catelli et al. |
| 5,878,796 A | 3/1999 | Phallen |
| 5,890,584 A | 4/1999 | Bonnet |
| 5,915,524 A | 6/1999 | Horlacher |
| 5,927,504 A | 7/1999 | Han et al. |
| 5,931,282 A | 8/1999 | Maruyama et al. |
| 5,947,262 A | 9/1999 | Boring et al. |
| 5,960,838 A | 10/1999 | Tietz et al. |
| 5,960,927 A | 10/1999 | Bahr |
| 5,975,280 A * | 11/1999 | Cote et al. ................ 198/474.1 |
| 5,979,147 A | 11/1999 | Reuteler |
| 6,029,797 A | 2/2000 | Olsson |
| 6,038,833 A | 3/2000 | Beringer |
| 6,050,060 A | 4/2000 | Spatafora et al. |
| 6,062,799 A | 5/2000 | Han et al. |
| 6,079,541 A | 6/2000 | Bercelli et al. |
| 6,112,885 A | 9/2000 | Kuster et al. |
| 6,119,440 A | 9/2000 | Benner, Jr. et al. |
| 6,119,848 A | 9/2000 | Hartness, III et al. |
| 6,141,943 A | 11/2000 | Hart et al. |
| 6,148,589 A | 11/2000 | Fukui et al. |
| 6,182,819 B1 | 2/2001 | Rehm |
| 6,186,314 B1 | 2/2001 | Conklin, Jr. |
| 6,209,716 B1 | 4/2001 | Bogle et al. |
| 6,220,444 B1 | 4/2001 | Calhoun |
| 6,234,300 B1 | 5/2001 | De Vos et al. |
| 6,237,750 B1 | 5/2001 | Damkjaer et al. |
| 6,253,809 B1 | 7/2001 | Paradies |
| 6,276,409 B1 | 8/2001 | Ellison |
| 6,321,897 B1 | 11/2001 | Cassoni et al. |
| 6,334,473 B1 | 1/2002 | Dumargue |
| 6,334,526 B1 | 1/2002 | Hatton |
| 6,341,630 B2 | 1/2002 | Reinecke |
| 6,343,628 B2 | 2/2002 | Reinecke |
| 6,343,690 B1 | 2/2002 | Britton et al. |
| 6,374,997 B1 | 4/2002 | Spandafora et al. |
| 6,474,368 B2 | 11/2002 | Clüsserath et al. |
| 6,474,464 B1 | 11/2002 | Horton et al. |
| 6,494,238 B2 | 12/2002 | Sindermann |
| 6,494,307 B1 | 12/2002 | Kozak et al. |

| | | |
|---|---|---|
| 6,520,316 B2 | 2/2003 | De Guglielmo et al. |
| 6,533,103 B2 | 3/2003 | Hartness et al. |
| 6,533,126 B1 | 3/2003 | Parsons |
| 6,581,653 B2 | 6/2003 | Servadei |
| 6,601,697 B2 | 8/2003 | Steeber et al. |
| 6,612,095 B2 | 9/2003 | Hartness |
| 6,612,567 B1 | 9/2003 | Kaya |
| 6,619,472 B2 | 9/2003 | Rehm |
| 6,629,403 B1 * | 10/2003 | Tisma ................... 198/867.05 |
| 6,675,951 B2 | 1/2004 | Preti |
| 6,684,602 B2 | 2/2004 | Reinecke |
| 6,692,050 B2 | 2/2004 | Graffin |
| 6,742,647 B2 | 6/2004 | De Greef |
| 6,748,983 B2 | 6/2004 | Bausch |
| 6,761,264 B2 | 7/2004 | Steeber et al. |
| 6,772,876 B2 | 8/2004 | Spangenberg |
| 6,905,012 B2 | 6/2005 | Lopes |
| 7,021,453 B2 | 4/2006 | Hartness et al. |
| 7,036,658 B2 | 5/2006 | Hartness et al. |
| 7,055,676 B2 | 6/2006 | Hartness et al. |
| 7,055,677 B2 | 6/2006 | Hartness et al. |
| 2001/0002532 A1 | 6/2001 | Murphy et al. |
| 2001/0013459 A1 | 8/2001 | Pattantyus-Abraham et al. |
| 2001/0027825 A1 | 10/2001 | Reinecke |
| 2001/0052216 A1 | 12/2001 | Hiramoto et al. |
| 2002/0011400 A1 | 1/2002 | Burkhart et al. |
| 2002/0060132 A1 | 5/2002 | Kloster et al. |
| 2002/0079199 A1 | 6/2002 | Wipf et al. |
| 2002/0139436 A1 | 10/2002 | Rosen et al. |
| 2002/0139645 A1 | 10/2002 | Haubert et al. |
| 2002/0144880 A1 | 10/2002 | Ikemoto et al. |
| 2003/0000969 A1 | 1/2003 | Mie |
| 2003/0029700 A1 * | 2/2003 | Miller ................... 198/803.7 |
| 2003/0037514 A1 | 2/2003 | Hartness et al. |
| 2003/0047427 A1 | 3/2003 | Spangenberg |
| 2003/0075547 A1 | 4/2003 | Stocchi |
| 2003/0106288 A1 | 6/2003 | Hartness et al. |
| 2003/0106779 A1 | 6/2003 | Stocchi |
| 2003/0116222 A1 | 6/2003 | Spatafora |
| 2003/0173186 A1 | 9/2003 | Hiramoto et al. |
| 2004/0151842 A1 | 8/2004 | Humele |
| 2005/0103599 A1 | 5/2005 | Hartness et al. |
| 2005/0103602 A1 | 5/2005 | Hartness et al. |
| 2005/0103603 A1 | 5/2005 | Hartness et al. |
| 2005/0103604 A1 | 5/2005 | Hartness et al. |
| 2005/0103605 A1 | 5/2005 | Hartness et al. |
| 2005/0103606 A1 | 5/2005 | Hartness et al. |

FOREIGN PATENT DOCUMENTS

| | | |
|---|---|---|
| DE | 19 637624 A1 | 3/1998 |
| EP | 0366067 A1 | 5/1990 |
| EP | 0471401 A2 | 2/1992 |
| EP | 0711717 | 5/1996 |
| EP | 1061014 A1 | 12/2000 |
| EP | 1188692 A2 | 3/2002 |
| FR | 1195550 | 11/1959 |
| GB | 513260 | 10/1939 |
| GB | 1264622 | 2/1972 |
| GB | 1301335 | 12/1972 |
| JP | 5785714 | 5/1982 |
| JP | 57209104 | 12/1982 |
| JP | S6087111 | 5/1985 |
| JP | 7206123 | 8/1995 |
| JP | 8120966 | 8/1996 |
| JP | 20 02249215 | 9/2002 |
| MC | 35162328 | 5/1962 |
| WO | WO 9529860 | 11/1995 |
| WO | WO 0051919 | 9/2000 |
| WO | WO 02 092240 A1 | 11/2002 |

OTHER PUBLICATIONS

U.S. Appl. No. 10/879,686, filed Jun. 29, 2004.
U.S. Appl. No. 10/879,690, filed Jun. 29, 2004.
U.S. Appl. No. 10/880,351, filed Jun. 29, 2004.
U.S. Appl. No. 11/131,625, filed May 18, 2005.
Posimat Universal Puck Screen Shot, Jul. 19, 2004.
Patent Abstracts of Japan JP57085714, May 28, 1982.
Patent Abstracts of Japan JP57209104, Dec. 22, 1982.
Patent Abstracts of Japan JP07206123, Aug. 8, 1995.
Patent Abstracts of Japan JP08120966A, May 14, 1996.
Patent Abstracts of Japan JP 2000255736, Sep. 19, 2000.
Patent Abstracts of Japan JP 2002249215, Sep. 3, 2002.
Int'l Search Report and Written Opinion for PCT/US2004/037361, Jun. 9, 2005.

* cited by examiner

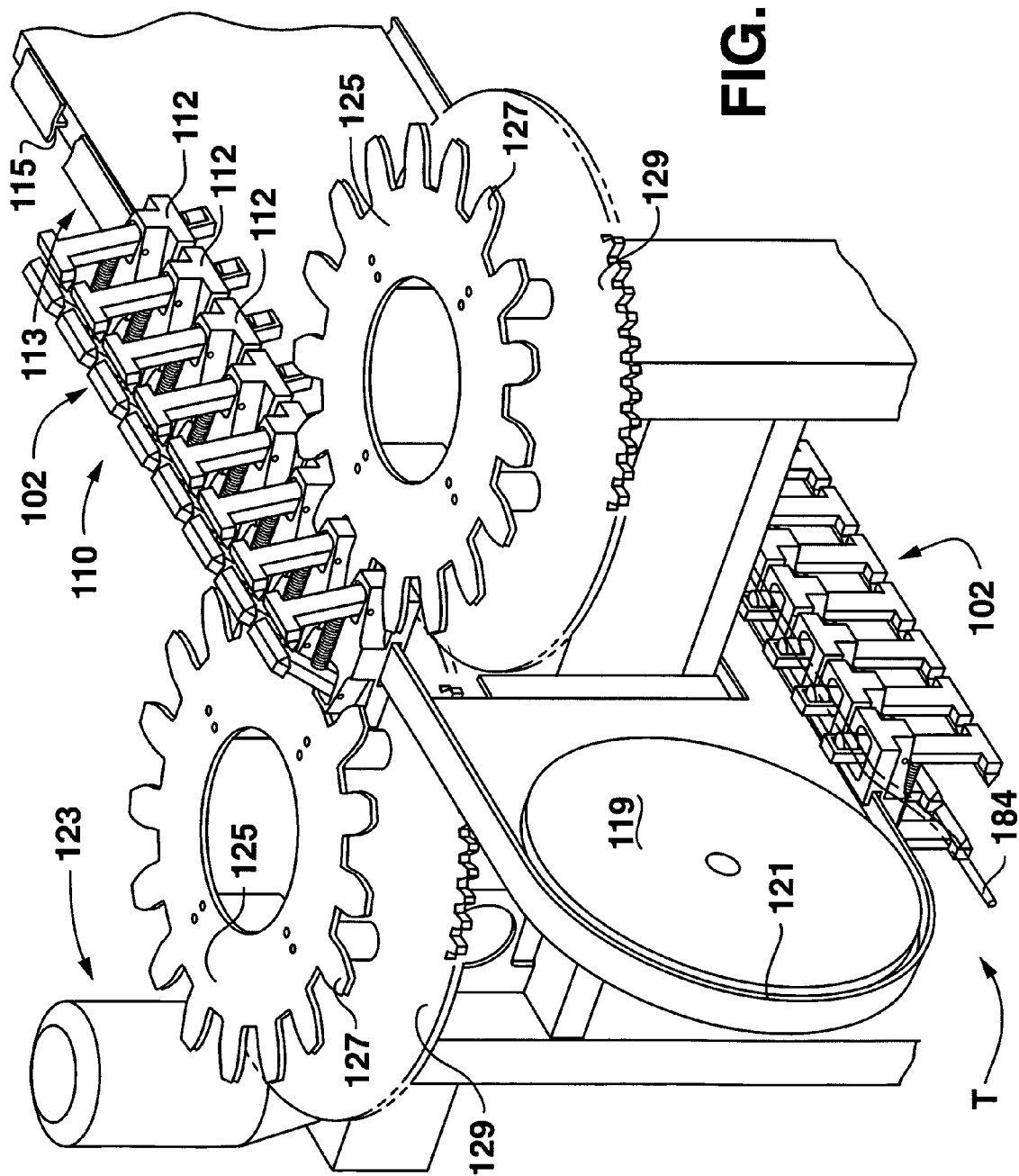

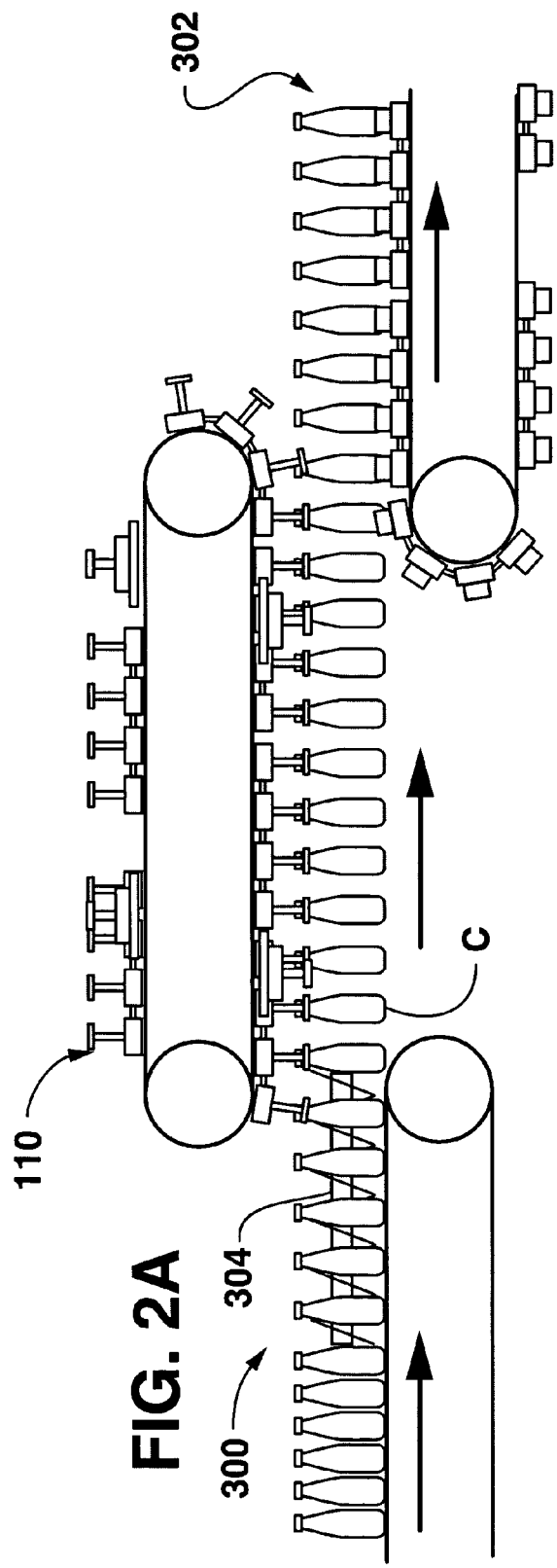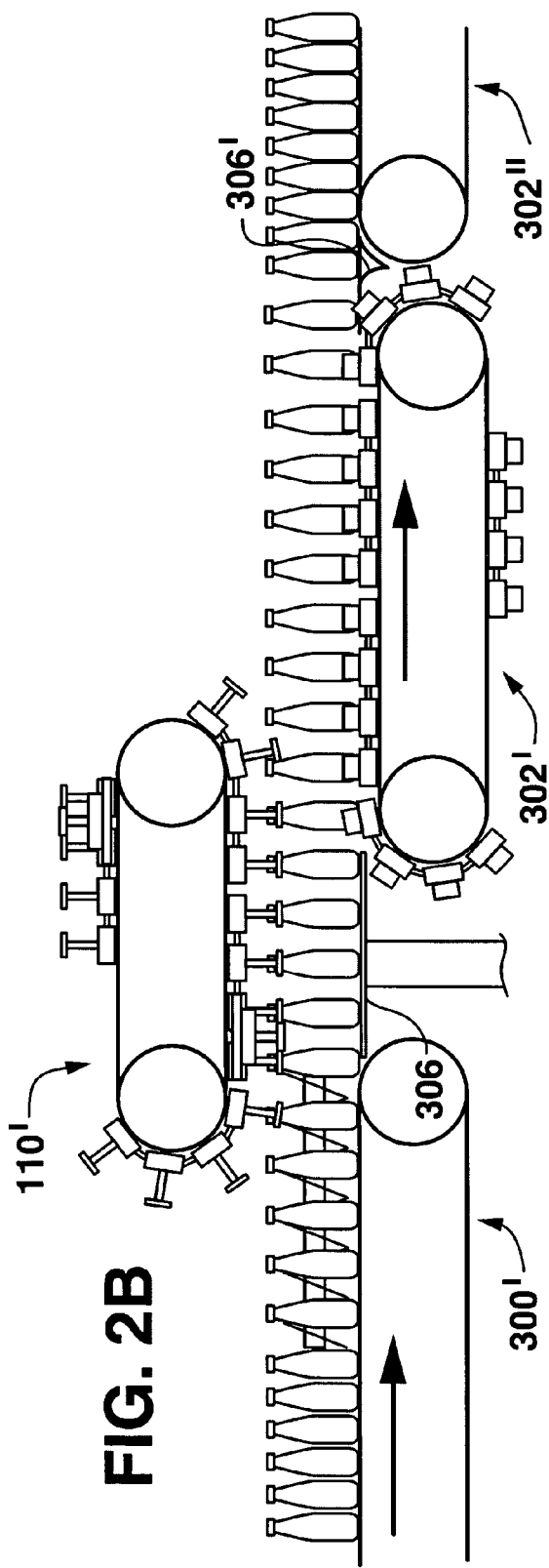

SHUTTLE CONVEYOR

FIELD OF THE INVENTION

The present invention relates generally to shuttle conveyor designs and related components. More particularly, the invention relates to conveyor designs that include shuttleable conveyor elements that are movable along a track for conveying one or more conveyed objects. The conveyors may include grippers, and may modulate flow along a system in various ways.

BACKGROUND

Various types of conveyors have been utilized for conveying objects in industrial production lines. Objects may be conveyed from work station to work station individually or in groupings, depending on the object and the task to be performed. It may or may not be important to maintain any spacing or control of the objects during some or all of the travel. For example, apples being conveyed may simply be stacked randomly on a conveyor, while bottles being filled may be held rigidly in place by a filling machine that has received the bottles from a conveyor.

Certain conveyor belts (sometimes also called chains) are made of a plurality of interconnected links, driven by motors that engage the conveyor belt. Such conveying systems are commonly employed in the transportation of manufactured goods and articles, and for containers. With these typical systems, the motor drives a toothed drive sprocket that engages complimenting driving recesses or "dogs" formed on the conveyor belt. These drive units can be disposed in any number along the length of the conveyor belt. Such a drive unit and conveyor system is disclosed in U.S. Pat. No. 6,119,848 which is assigned to the assignee of the present invention, and is incorporated herein by reference in its entirety for all purposes.

Link type conveyor belts are sometimes designed having a knuckle/socket joint arrangement wherein one part of the link has a rounded knuckle and the opposite part has a socket formed by two extending edges. The knuckle of one link fits into the socket of a neighboring link. The knuckle is able to move in various directions within the socket, which allows for the conveyor system as a whole to curve and move.

The interconnected links typically have a platform member connected to or formed integral with the link's upper (conveying) surface. The platform member is generally shaped to match the neighboring platform members on other links such that the links can turn in a plane or twist while moving around curved sections of the conveying system, yet are also shaped such that the cracks and spaces formed between the links are minimized. The platform members can be connected to the links in several different ways. For instance, the platforms may have pegs extending therefrom which match corresponding slots on the links. Alternatively or additionally, the platforms can have snap springs which lock into place on corresponding sections of the links. Such a knuckle link with a platform surface member is disclosed in U.S. Pat. No. 6,209,716 which is owned by the assignee of the present invention and incorporated herein by reference in its entirety for all purposes.

In conventional endless loop conveyor systems, the conveyor belt (or chain) follows a path having a conveying section and a return section. In the conveying section the conveyor carries the conveyed objects from a process start point to a process finish point (depending on the application), and in the return section the conveyor returns from the finish point back to the start point. Thus, depending on the orientation of the conveyor, a substantial portion of the conveyor may not be used to actually convey objects at any given point in time. Accordingly, the cost of an endless conveyor per unit of active conveying section is increased due to the manner in which endless conveyors are conventionally configured and driven. The increased costs include original purchase, repair, maintenance, and/or installation costs for the length of the conveyor required along the return path.

Other conventional systems used to convey objects include "puck" systems, in which a freely moving puck carries a conveyed object along a conveyor. Pucks are often used to hold objects in a given orientation for a certain processing step. If the object is a container, the process may be filling, capping, etc. Guides along the sides of the conveyor may direct the puck along the direction of travel without leaving the conveyor. The puck may have movable parts for holding the object. The puck does not follow any track, but freely moves along a conveyor from station to station as desired. The puck may be gripped and/or aligned by a processing station (for example, a container filler) for a time, but the puck does not follow a defined track. Pucks can be problematical for various reasons. For example, because they are loose on a conveyor, pucks and their conveyed objects can be tipped over. Also, pucks may undesirably spin or move on a conveyor unless specifically guided since they do not follow any track. Further, different-sized pucks may be required if a line is to be converted from one object to another, which an be costly in terms of stocking and switching families of pucks.

SUMMARY OF THE INVENTION

According to certain aspects of the invention, a gripping shuttle conveyor is disclosed suitable for conveying objects along a transport direction. The gripping shuttle conveyor includes a track extending along a conveying path, and a plurality of shuttle elements independently movable along the track. Each shuttle element includes a plurality of connected links, each link having a length extending across the direction of transport and a width extending along the direction of transport. Each link has a conveying surface for conveying one or more of the objects and each link defines mating structure for following the track along the conveying path. Each shuttle element includes at least one movable gripping member for selectively gripping conveyed objects. Various options and modifications are possible.

For example, each link may have at least one of the gripping members. Also, each link may have two of the gripping members, the two gripping members being on each link are adjacent one another along the direction of transport, or the two gripping members being on each link are opposite one another across the direction of transport.

A drive mechanism may be provided for moving the shuttle elements along the track. The drive mechanism may drive the links directly, or an intermediate conveyor may be included configured to slide along the track and having an intermediate track, the shuttle elements being configured to slide along the intermediate track, the drive mechanism driving the intermediate conveyor along the track. The intermediate conveyor and the shuttle elements may be configured so that the shuttle elements are frictionally driven by the intermediate conveyor.

Each shuttle element may have at least one gripping member extending adjacent along more than one of the respective plurality of links of the shuttle element.

Each shuttle element may include connecting elements to connect the plurality of links within the shuttle element. The connecting elements may include one of a cable, a rod, a ball and socket joint, or an overmold.

The track may define straight portions or bends such as vertical or horizontal curves and/or three-dimensional twists followed by the shuttle elements. The track may comprise one of a T-shaped cross-section, opposed rails, or channels.

A plurality of drive mechanisms may be disposed along the track for moving the shuttle elements along the track, the shuttle elements being pushed to a given drive mechanism via force provided by an upstream drive mechanism. A first portion of the drive mechanisms may be disposed along a conveying portion of the track and a second portion of the drive mechanisms may be disposed along a return portion of the track. The drive mechanisms may cause the shuttle elements to move along at least a portion of the return portion faster than along the conveying portion. Further, the flow of the shuttle elements may be modulated in any desired way, for example to speed conveying portion flow at startup, or to allow the conveyor to function in an accumulator mode.

Also, the shuttle elements may define a collective length less than a length of the track. If so, the shuttle elements may define a collective length at least about 20 percent less than a length of the track. Also, the shuttle elements may define a collective length from about 50 to about 80 percent of a length of the track.

According to certain other aspects of the invention, a gripping shuttle conveyor is disclosed suitable for conveying objects along a transport direction. The gripping shuttle conveyor includes a track extending along a conveying path, the track defining a length, and a plurality of shuttle elements independently movable along the track. Each shuttle element defines mating structure for following the track along the conveying path, each shuttle element includes at least one movable gripping member for selectively gripping conveyed objects, the shuttle elements defining a collective length less than the length of the track. A drive mechanism moves the shuttle elements along the track. As above, various options and modifications are possible.

According to certain other aspects of the invention, a gripping shuttle conveyor is disclosed suitable for conveying objects along a transport direction. The gripping shuttle conveyor includes a track extending along a conveying path, the track defining a length and having a conveying portion and a return portion, and a plurality of shuttle elements independently movable along the track. Each shuttle element defines mating structure for following the track along the conveying path. Each shuttle element includes at least one movable gripping member for selectively gripping conveyed objects along the conveying portion, the shuttle elements defining a collective length less than the length of the track. A drive mechanism drives the shuttle elements faster along at least a portion of the return portion of the track than along the conveying portion of the track. Again, various options and modifications are possible.

According to certain other aspects of the invention, a shuttle conveyor is disclosed suitable for conveying objects along a transport direction. The shuttle conveyor includes a track extending along a conveying path, the track defining a length and having a conveying portion and a return portion, and a plurality of shuttle elements independently movable along the track. Each shuttle element defines a mating structure for following the track along the conveying path. Each shuttle element conveys objects along the conveying portion. The shuttle elements define a collective length less than the length of the track. A drive mechanism drives the shuttle elements so as to selectively modulate the flow of the shuttle elements along the track. Again, various options and modifications are possible.

BRIEF DESCRIPTION OF THE DRAWINGS

FIG. 1 is a perspective view of an embodiment of a gripping shuttle conveyor according to certain aspects of the present invention, including a gear drive mechanism and track;

FIG. 2A is a diagrammatical representation of one example of a transfer station including an intermediate top gripping shuttle conveyor for transferring conveyed articles from a first conveyor to a second bottom gripping shuttle conveyor;

FIG. 2B is a diagrammatical representation of one example of a top gripping shuttle conveyor for transferring conveyed articles from a first conveyor to a second bottom gripping shuttle conveyor;

DETAILED DESCRIPTION OF THE PREFERRED EMBODIMENTS

Figure 3:
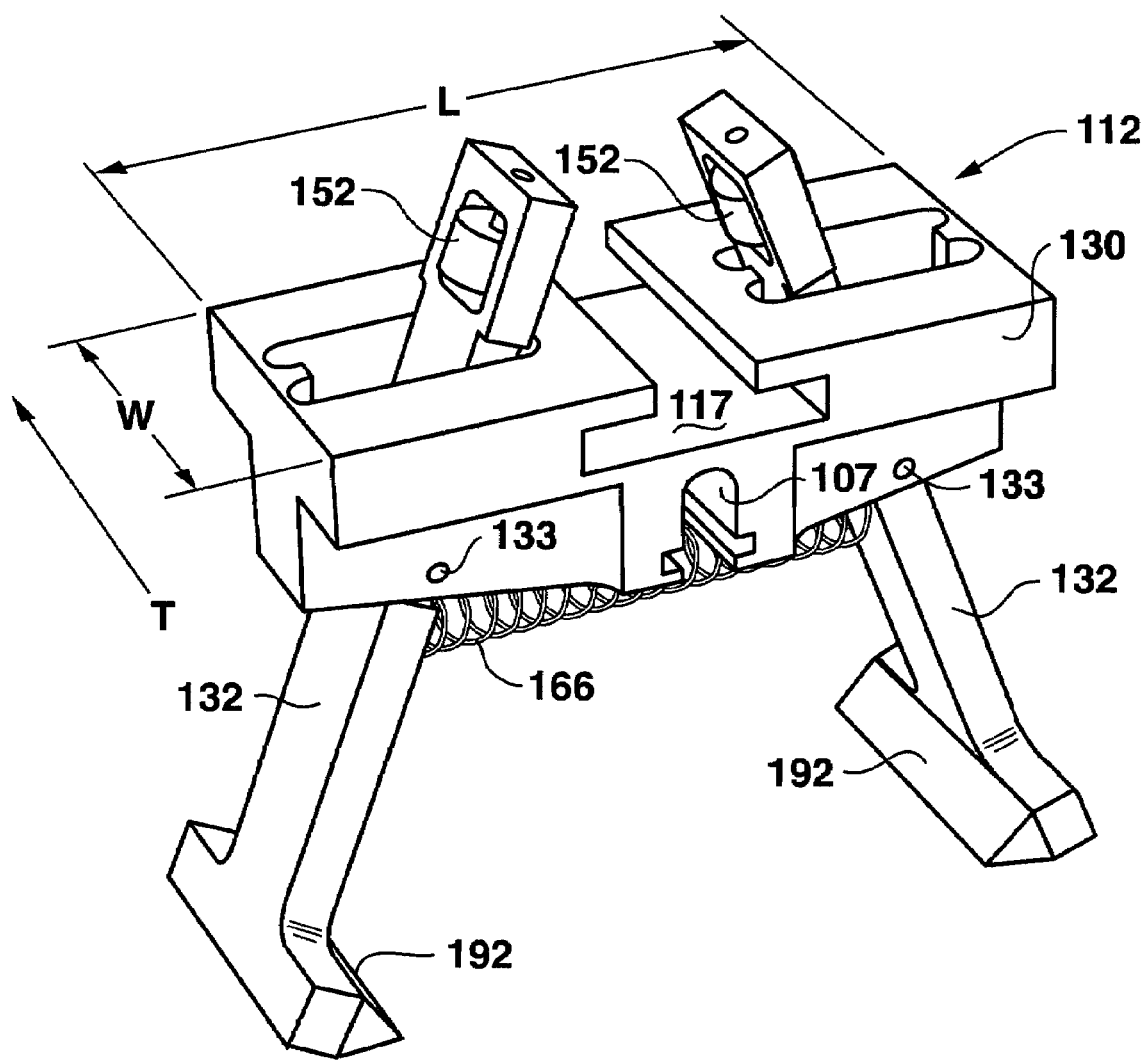
FIG. 3 is a top perspective view of a link of the conveyor of FIG. 1 in a first, opened position.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations. In discussing various embodiments, like or similar reference numerals are used below with like or similar parts of various embodiments.

As shown in the various figures, numerous embodiments of a shuttle conveyor are disclosed. It should be understood that the present invention encompasses both a full conveyor structure made of individual links, connecting structures, and/or other components, and individual components for a conveyor including the connection elements and their components. Other aspects of the invention include the attachment or guidance of the conveyor or its components to links or to mating elements of a processing system. As shown, the various conveyors are suitable for gripping and conveying containers through various portions of a container-processing system, such as rinsers, fillers, cappers, labelers, or any station along an assembly line. The examples shown herein are for explanatory purposes only, and are not intended to limit the invention only to that shown and disclosed.

Figure 9:
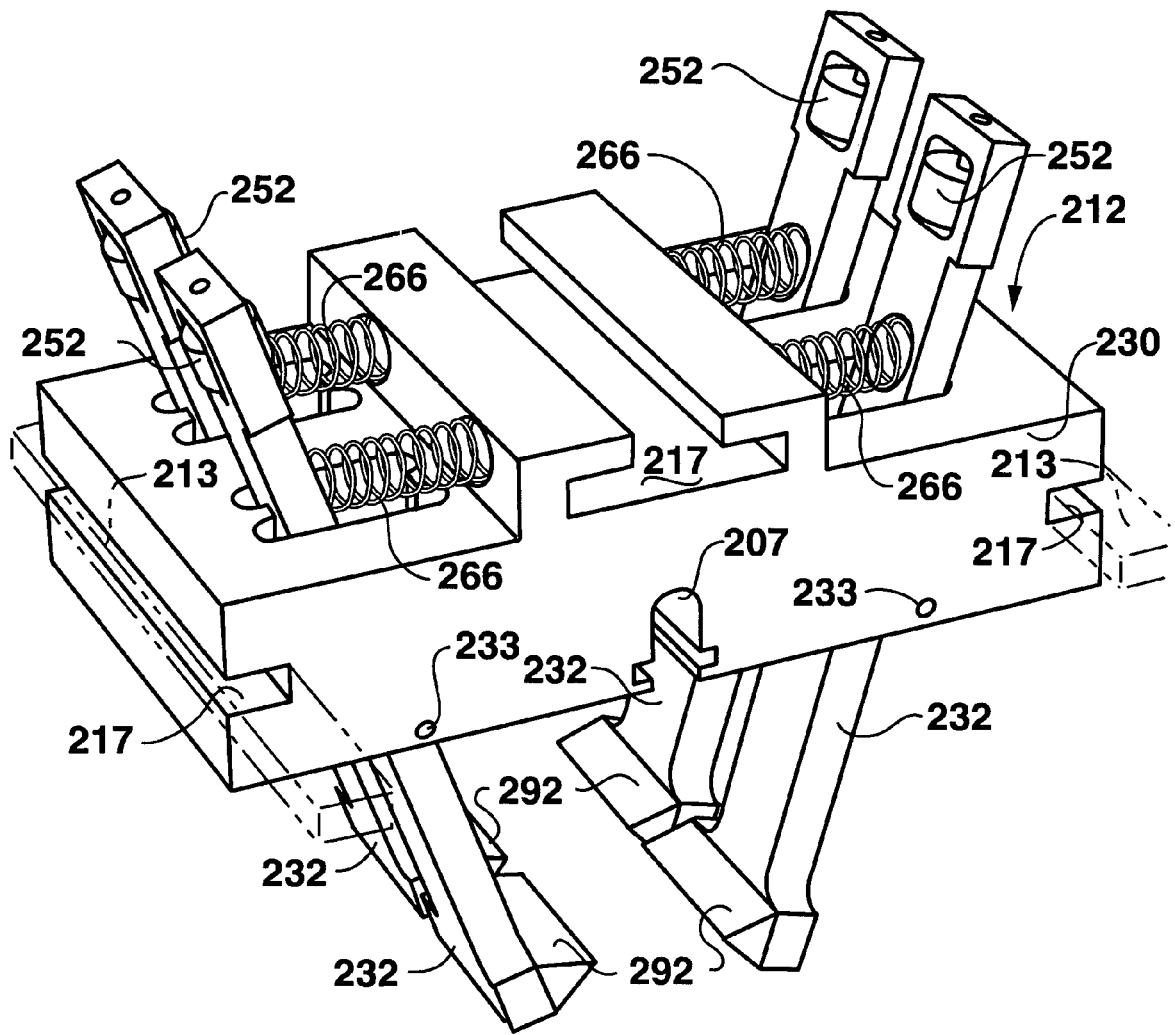
FIG. 9 is a top perspective view of a link for another embodiment.

FIGS. 1-8 show one example of a gripping shuttle conveyor and potential use of such conveyor with container processing systems. As shown, conveyor 110 includes a plurality of shuttle elements 102 independently movable along a track 113. In this embodiment, each shuttle element 102 includes a plurality of connected links 112. Shuttle elements 102 convey objects such as containers along a direction of transport T. As discussed below with reference to FIGS. 2A and 2B, conveyor 110 may optionally be used to grip objects spaced from or in contact with conveying surfaces 138 (FIG. 5) of shuttle element 102 and/or its links 112. Conveyor 110 is thus suited to grip and convey bottles by the neck, either upright or inverted, if desired. However, conveyor 110 could also carry objects sitting on conveying surface 138. FIGS. 2A and 2B, discussed in detail below, show various examples of gripping shuttle conveyor system configurations for top and bottom gripping conveyors. FIG. 9, discussed below, discloses a modified link 212, having many features in common with link 112.

Figure 4:
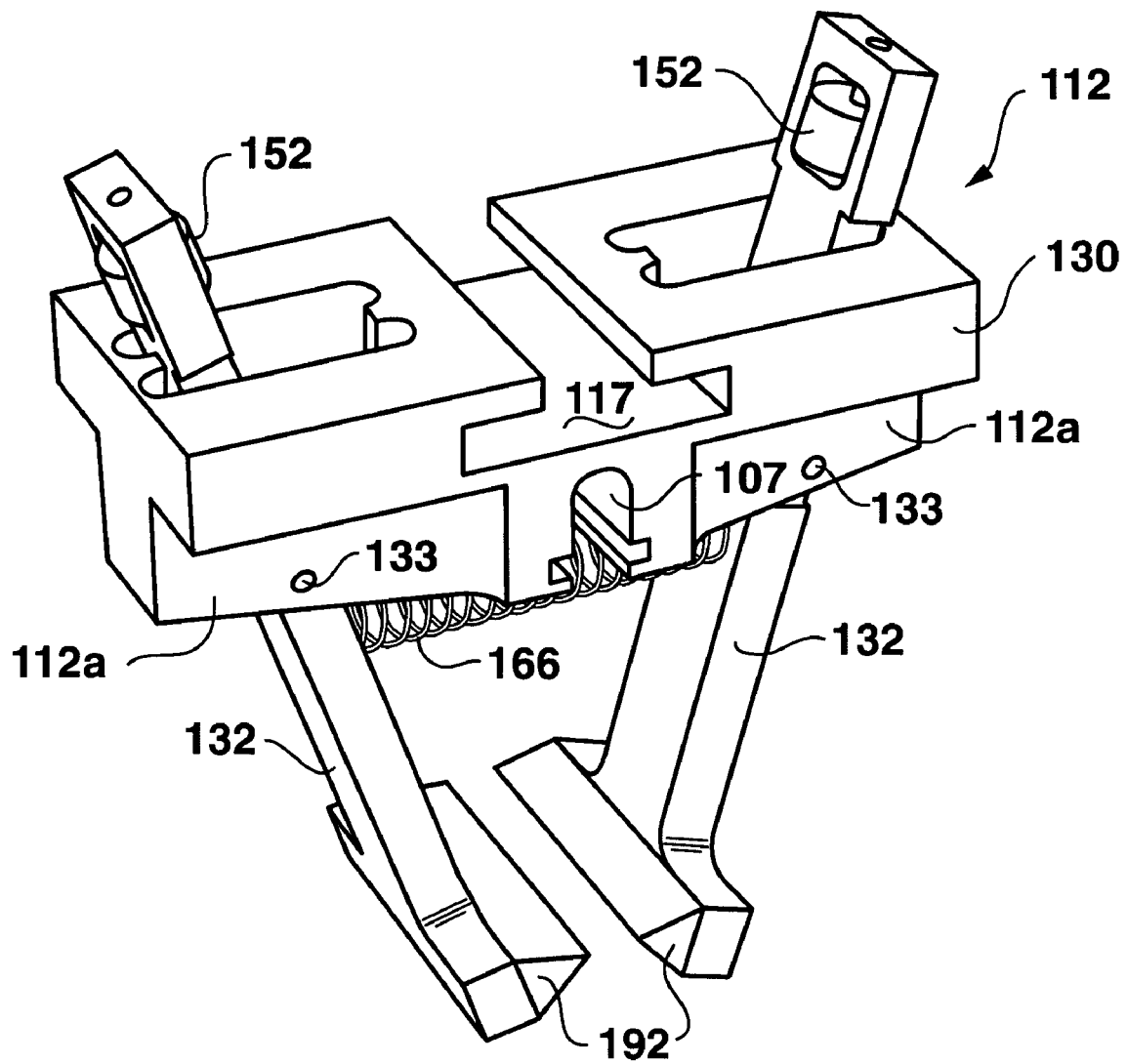
FIG. 4 is a top perspective view of a link of the conveyor of FIG. 1 in a second, closed position.

Each link 112 has a length L extending across the direction of transport T and a width W extending along the direction of transport T (see FIG. 3). Each link 112 has a body 130, and may have at least one gripping member 132, and at least one spring member 166. As shown, two opposed gripping members 132 are employed in this embodiment. Cam follower members 152 may be located on one or both of gripping members 132, which are selectively movable between a first, opened position (as shown in FIG. 3) and a second, gripping position (as shown in FIG. 4). The spring member 166 urges the gripping members toward the second, gripping position. Gripping members 132 may thus contact one of the conveyed objects C to hold the object during transport when in the second position (see FIG. 6). Camming members such as cams or, as shown, rails 184 (FIG. 8) may be provided to move gripping members 932 toward the first, opened position against the force of springs 166. Although gripping members 132 are shown as operating independently, if desired, their motions could be more directly tied by use of interacting circular gears, sliders, rack and pinion arrangements, or the like.

The movable gripping members may be attached in various ways. For example, as shown, shuttle element 102 may include pins 133 around which gripping members 132 pivot. As shown, spring members 166 comprise tension springs. However, if desired, compression springs located on the opposite side of pins 133 could be used, or leaf springs could be substituted as well. The spring constant of spring members 166 can be selected according to the application to as to be able to securely hold the desired object, whether full or empty, in motion and/or traveling around curves. If desired to achieve a certain result, multiple spring members 166 could also be used.

One or both of gripping members 132 may include a flexible adaptor 192 for more securely holding the gripped objects in a particular location relative to shuttle element 102. Further, if desired (see, e.g., FIG. 10), the adaptor 192 or the griping member 132 may be shaped so that adjacent containers C may be gripped "on-centers" with a predetermined spacing for interaction with other machinery (see, e.g., FIGS. 2A and 2B). The size and shape of adaptors 192 may be altered to suit the application and/or conveyed objects. Shuttle elements 102 and/or adaptors 192 may also be particularly configured to allow gripping members 132 to grip bottlenecks, or to grip objects spaced from the links or with the links inverted, as shown.

Figure 5:
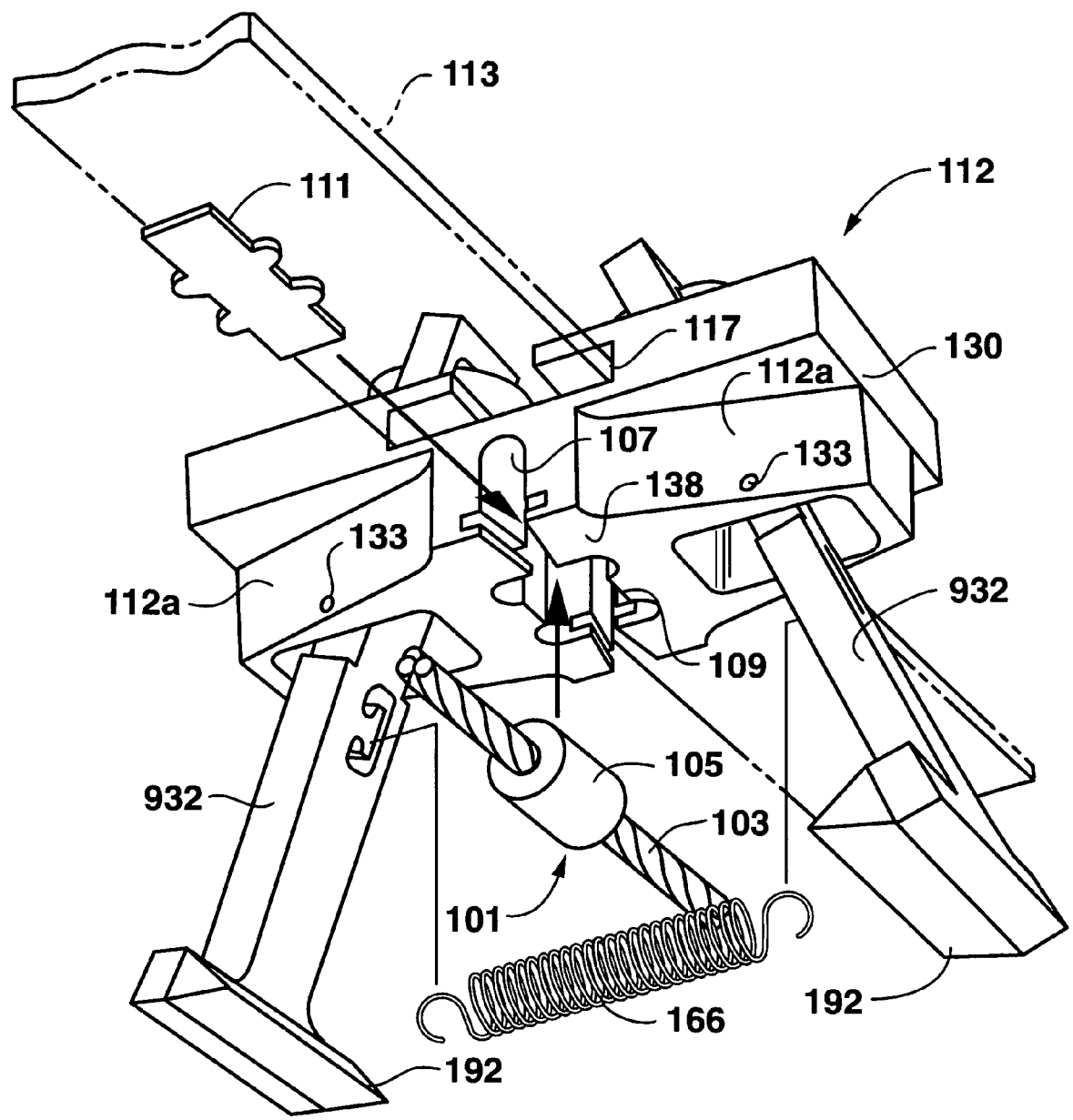
FIG. 5 is a partially exploded bottom perspective view of a link of the conveyor of FIG. 1.
Figure 6:
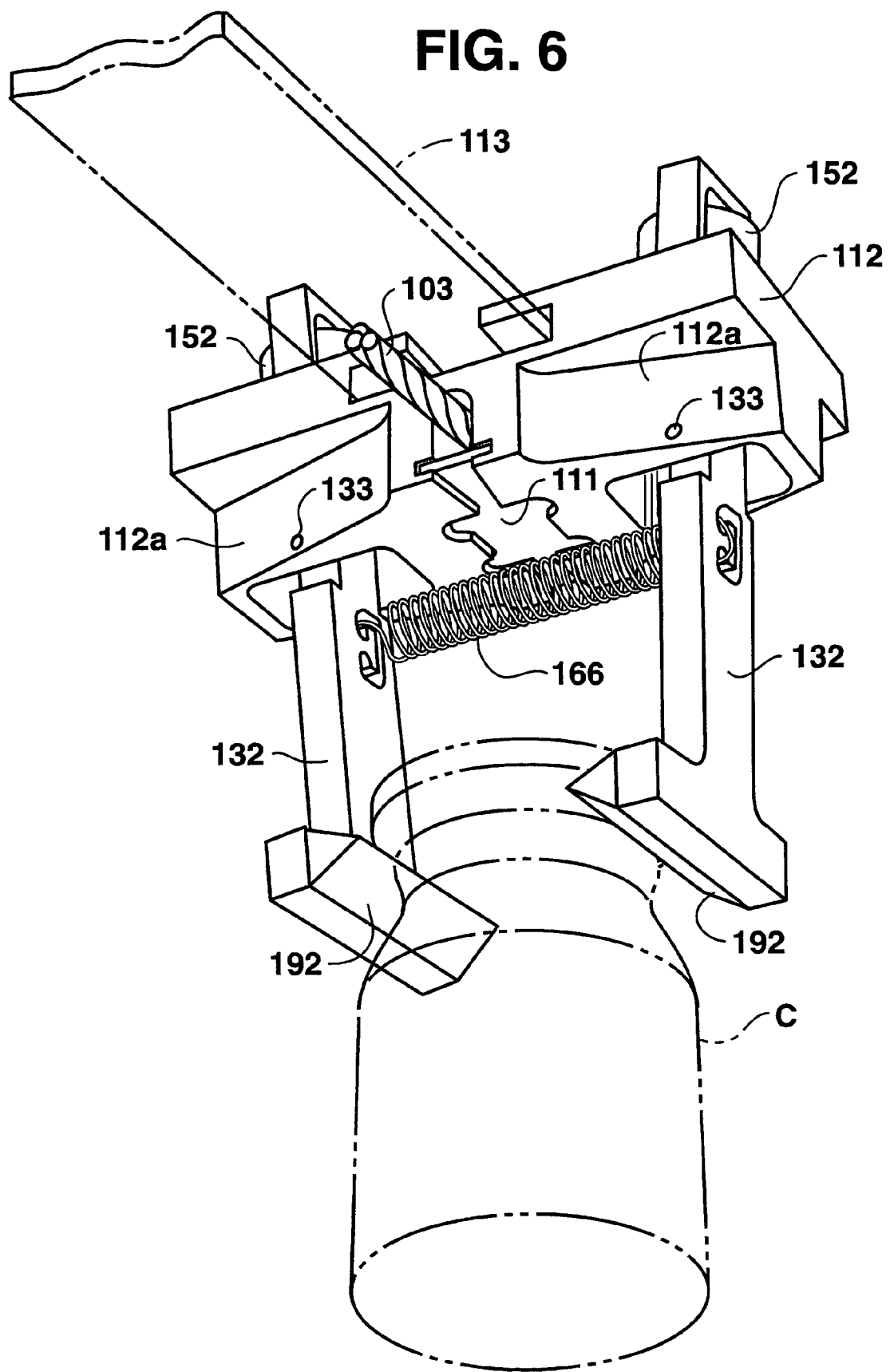
FIG. 6 is a bottom perspective view of a link of the conveyor of FIG. 1 holding an object such as a container.
Figure 7:
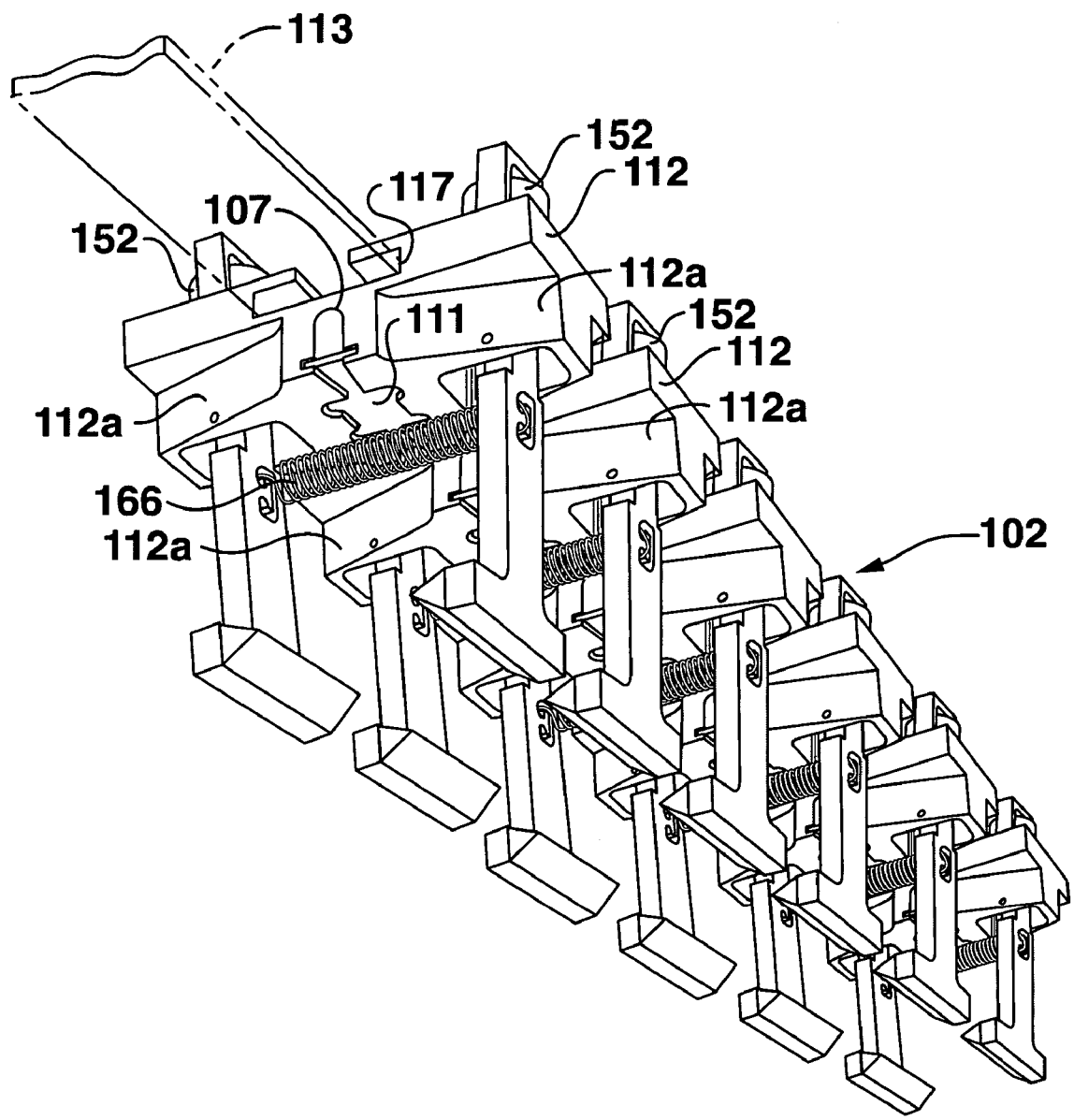
FIG. 7 is a bottom perspective view of a plurality of connected links of the conveyor of FIG. 1 disposed on a track.
Figure 8:
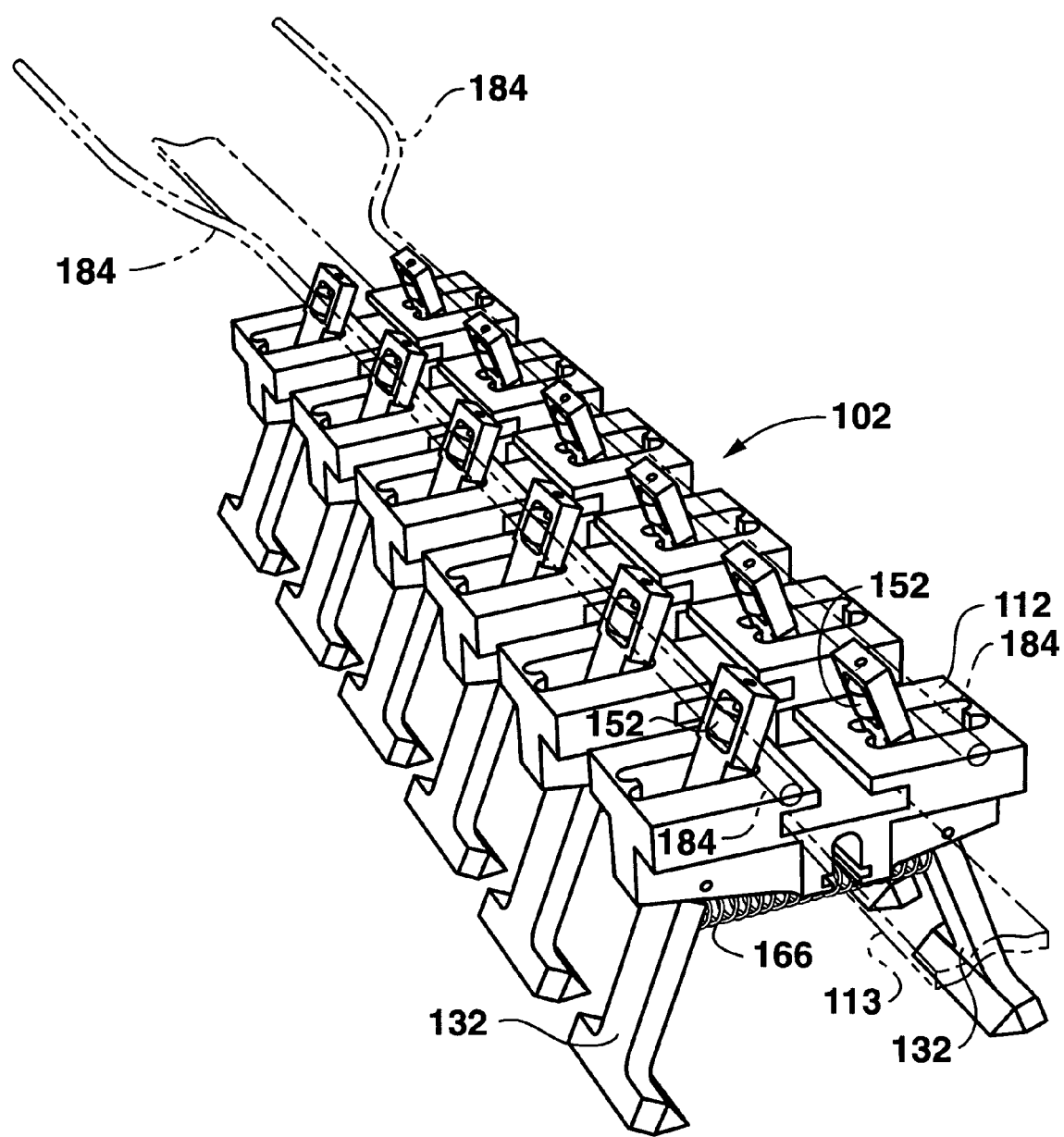
FIG. 8 is a top perspective view of a plurality of connected links of the conveyor of FIG. 1 disposed on a track, and acted upon by a camming rail.

If shuttle element 102 is made of a plurality of individual links 112, gripping members 132 on adjacent links 112 may be connected via connection elements such as a flexible connecting member 101 (FIG. 5). The connection elements may be configured so as to allow three-dimensional movement of a given link relative to an adjacent link. As used herein, three-dimensional movement means relative movement between links about three axes: twisting between adjacent links around an axis parallel to the direction of transport, and around two axes perpendicular to the direction of transport (i.e., horizontally and vertically, as oriented in FIG. 3). If each link grips and conveys one container, the connection elements may allow twisting of approximately 180° or more per foot of member 101.

Flexible connecting member 101 may comprise a braided wire cable 103 made of stainless steel, or any other suitable materials or the like, with mounting members 105 secured to it at given intervals. Mounting members 105 may comprise cylindrical swages, as shown, made of aluminum, stainless steel, or any other suitable material or the like, secured to cable 103 by a set screw, swaging, welding, brazing, or any other reliable manner of attachment. If such a flexible connecting member 101 is used, a groove 107 may be formed in conveying surface 138 of link 112 sized so that cable 103 may be slid into the groove. A retaining portion 109 of groove 107 may be provided to receive mounting member 105. Retaining portion 109 may be a widened portion of groove 107 configured for receiving mounting member 105. If desired a retainer 111 may be slid over top of mounting member 105 and into a slot 113 in link 112 adjacent groove 107 to retain the mounting member in retaining portion 109. Retainer 111 may be a spring-type member having leaf spring type edges if desired to hold it in place. Alternately, a set screw, a pin, etc., may be used to secured mounting member 105 within retaining portion 109. Depending on the arrangement and travel of conveyor 110, a retainer or the like may not be needed, as tension and friction caused by the arrangement and travel may be sufficient to hold link 112 in place on flexible connecting member 101. In the configuration shown, individual links 112 may be removed from flexible connecting member 101 for service, repair, cleaning, or changing of conveyed object or application, if desired. While such removable mounting is not necessary for all aspects of the invention, such arrangement may be useful in certain applications.

In FIG. 1, shuttle elements 102 include eight links 112. However, it should be understood that use of any number of links is possible, depending on the application. Factors that may impact the number of links per shuttle element include, the size, weight, and type of object conveyed, the intended purpose, the length of the track, etc. For example, for conveyed objects such as liter-sized bottles, shuttle elements of 5–20 links would be useful to achieve the benefits of avoiding having links fill the entire conveying path while still providing a reliable conveyed supply of objects. For other applications, as few as one link could be used per shuttle element, and for other applications, many more than 20 links could also be used. It would also be possible to have differently sized shuttle elements or links on a single conveyor, if desired, to hold different amounts or types of objects.

As shown, conveyor 110 may include a track 113, shuttle elements 102 being configured to follow the track. Track 113 may have a T-shaped cross section 115 (see FIG. 1), and shuttle elements 102 may include a T-shaped channel 117 for receiving and following the track. Conveyor 110 may utilize other guides instead of track 113, if desired, and shuttle elements 102 would be reconfigured accordingly.

As shown, a single track configuration may be employed. Alternatively, as shown below in FIGS. 16 and 17, a dual track may be used. Also, in FIG. 1, mating structure comprising channel 117 is formed in links 112 of shuttle elements 102. Instead, the mating structure may be formed in intermediate elements, as shown below in FIGS. 10–14.

Conveyor 110 may also include a rotatable wheel 119 for contacting the shuttle elements 102 to direct them around any curves in track 113, such as curve 121 shown in FIG. 1. Use of wheel 119 reduces friction that would be present between shuttle elements 102 and track 113 along a curve. Such a wheel could also be utilized in non-curved portions of travel as well. Also, track 113 could bend laterally or twist along the direction of travel, if desired. In particular, track 113 could invert before bottles pass through a rinser and then turn back upright.

A drive mechanism may also be provided for driving shuttle elements 102 in a given direction. As shown, the drive mechanism may comprise a motor and motor control 123 driven by a conventional programmable logic controller, and at least one driven gear 125 having teeth 127. Teeth 127 are configured to interleave into openings in shuttle elements 102, such as between adjacent links 112 in a rack and pinion arrangement if links are used, to drive the shuttle elements. Links 112 and/or shuttle elements 102 may accordingly include side cut outs 112a configured for receiving teeth 127 of gear 125. The drive mechanism may include two of the driven gears 125 disposed on opposite sides of shuttle elements 102, and may also include intermediate gears 129 configured to drive gears 125 at a given speed, as well as other intermediate gearing (not shown) between the output of motor 123 and gears 129. Thus, shuttle elements 102 may be readily driven by direct contact with gears 125.

Figure 15:
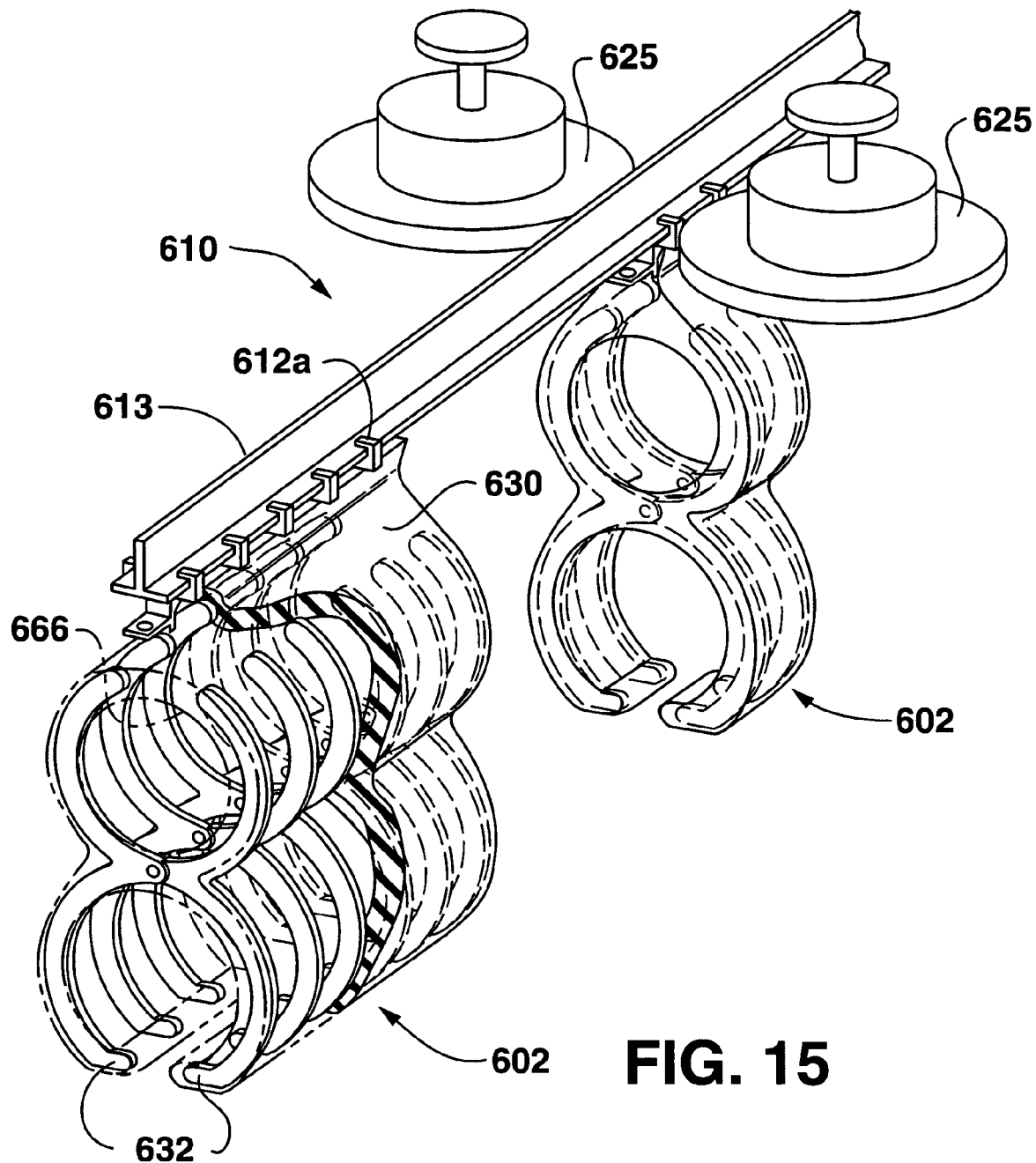
FIG. 15 is a perspective view of a portion of another conveyor according to certain other aspects of the invention.

Alternatively, gears 125 could be replaced with wheels (not shown) that frictionally contact outer ends of shuttle elements 102 (see FIG. 15). If so, the wheels could have flexible materials about their edges, and/or shuttle elements 102 could have similar materials, for a secure frictional engagement so as to reliably drive shuttle elements 102.

As shown in FIGS. 2A and 2B, shuttle gripping conveyors may be utilized as parts of various conveying systems. In FIG. 2A, a top gripping shuttle conveyor 110 conveys objects from a first (non-gripping) conveyor 300 over a distance to a second (gripping) conveyor 302. Conveyor 302 may be, as illustrated, a shuttle gripping conveyor. A timing mechanism such as a timing screw 304 may be utilized to space conveyed objects C for gripping by conveyor 110. The parameters of timing mechanism 304 (such as screw pitch, rotation speed) may readily be designed by one skilled in the art so as to space containers "on centers" of rinsing elements used to rinse out the containers, filling elements used to fill the containers, and/or capping elements used to cap the containers, etc., if desired. Timing mechanism 304 may comprise one or more screws, available from Morrison Timing Screws, or any other conventional screw mechanism. Alternatively, timing mechanism 304 could comprise a star wheel or any other timing device. Conveyors 110 and 302 should be synchronized by a controller, as can be carried out by one skilled in the art in conjunction with sensors, servomotors, or the like.

FIG. 2B shows a relatively shorter shuttle gripping conveyor 110' disposed between a first (non-gripping) conveyor 300' and a second (gripping) conveyor 302'. Conveyor 110' forms part of a transfer station used to transfer articles from conveyor 300' to 302', rather than a conveyor to transport over relatively larger distances. A guide 306 may be used to assist in maintaining alignment and spacing of the conveyed objects between conveyors 300' and 302'.

FIG. 2B also shows further downstream a conveyor 302" that receives objects from conveyor 302', across an optional guide 306'. As shown, no transferring top gripping conveyor, such as conveyor 110', is used for this transfer, but one could be if desired. Conveyor 302" is not a gripping conveyor and the conveyed objects are accordingly not held "on centers". FIG. 2B illustrates that gripping shuttle conveyors may be used to transfer to or from non-gripping conveyors or gripping conveyors, with or without an intermediate transfer conveyor, as dictated by the system parameters.

Therefore, a top gripping conveyor 110 such as shown in FIG. 1 may be utilized as in FIGS. 2A and 2B to remove conveyed objects from a first conveyor, and grip the objects in shuttle elements as spaced by a timing mechanism, and then transfer the objects to another conveyor. Camming members (not shown) may selectively open and close the grippers of gripping conveyors to grip and release the objects. Similarly, other camming members (not shown) may open grippers on downstream shuttle elements to allow the objects to be handed off. The speed and spacing of the shuttle elements and timing mechanisms should be controlled with sensors, such as optical or electronic devices, so as to ensure synchronized operation. A conventional programmable logic controller could be used to drive conveyor and timing mechanism motors based on sensor feedback. Such structure would be beneficial in aligning the conveyed objects at the timing mechanism while gripped from above so that gripping portions of the downstream conveyor do not interfere with the mechanism. Then, the top gripping conveyor could pass control to the downstream conveyor, all controlled by simple cams and followers. If a timing mechanism or other such objects that might be interfered with are not present near the moveable portions of the gripping conveyor, then it may be suitable to simply cam open grippers of the gripping conveyor to directly pass the conveyed articles to the next station, conveyor, etc. However, combinations of a top gripping conveyor and bottom gripping conveyor, in either order, along with other gripping or non-gripping conveyors, whether shuttle conveyors or continuous endless conveyors, can all have various utilities in article handling and container filling.

As shown in FIGS. 2A and 2B, shuttle gripping conveyors 110, 302, 110', 302' may be driven by drive mechanisms 308, which may comprise gears 125, as in FIG. 1. Alternatively, wheels such as are shown in FIG. 15 could be used as drive mechanisms 308. Enough drive mechanisms 308 should be supplied to provide a ready and substantially uninterrupted supply of shuttle elements for conveying the conveyed objects.

The drive mechanisms on the return side (e.g., the top of conveyor 110 in FIG. 2A) can be operated to drive the shuttle elements faster than the rate of travel on the conveying side (e.g., the bottom of conveyor 110 in FIG. 2B). Thus, once a shuttle element releases its conveyed object(s), it can be rapidly returned to queue up to convey another object. Therefore, potentially the longer the shuttle gripping conveyor is, the greater is the potential savings in terms of length of shuttle elements versus length of total conveyor path. Having more rapidly driven return drive mechanisms can thus help achieve such savings.

The shuttle elements can be mounted to the track in such number that the collective length of the shuttle elements is less than the length of the track. Again, the "gaps" along the track, which may be partially or entirely located on the return portion, achieve cost savings by requiring less conveyor material. The collective length of the shuttle elements may, for example, be at least about 20 percent less than the track length for some applications and from about 50 to about 80 percent of the track length in other situations.

FIG. 9 shows a link 212 for a conveyor according to other aspects of the invention. As shown in this figure, the resulting conveyor includes a plurality of shuttle elements 202 including one or more of links 212, each having a body 230. Four opposed gripping members 232 are provided on each link, in pairs. As above, a cam follower member 252 is moveable to selectively move each gripping member 232 between a first, opened position and a second, gripping position. A spring mechanism 266 is provided between each pair of gripping members 232.

Links 212 are similar to links 112 in many ways. However, links 212 have two pairs of gripping members 232 per link, rather than one. As above, gripping members 232 may include flexible adaptors 292, which may be made of material such as plastic, rubber, or the like.

Spring members 266 are compression springs, as above, to urge the gripping members toward the second, closed position. A cam member (not shown) may contact each cam follower member 252 to move gripping members 232 in the opposite direction. Of course, the position of the spring member and/or cam member could be reversed so as to urge gripping members 232, in opposite directions. Also, the compression spring members could be replaced with tension springs on the opposite side of pivot pins 233, or with leaf springs. As with embodiments above, links 212 could be modified in various other ways, such as by modifying the adaptor 292, etc.

Links 212 may include slots 217 for receiving a track, which may comprise two opposed rails 213. Also, links may include a T-shaped slot 117 for following a T-shaped track. Either way, links 212 may be guided along the track. As above, links 212 may be connected into a multi-link shuttle element via a flexible connector such as a wire cable, or other structures, depending on the application. Also, a single link 212 may itself comprise a shuttle element.

Figure 10:
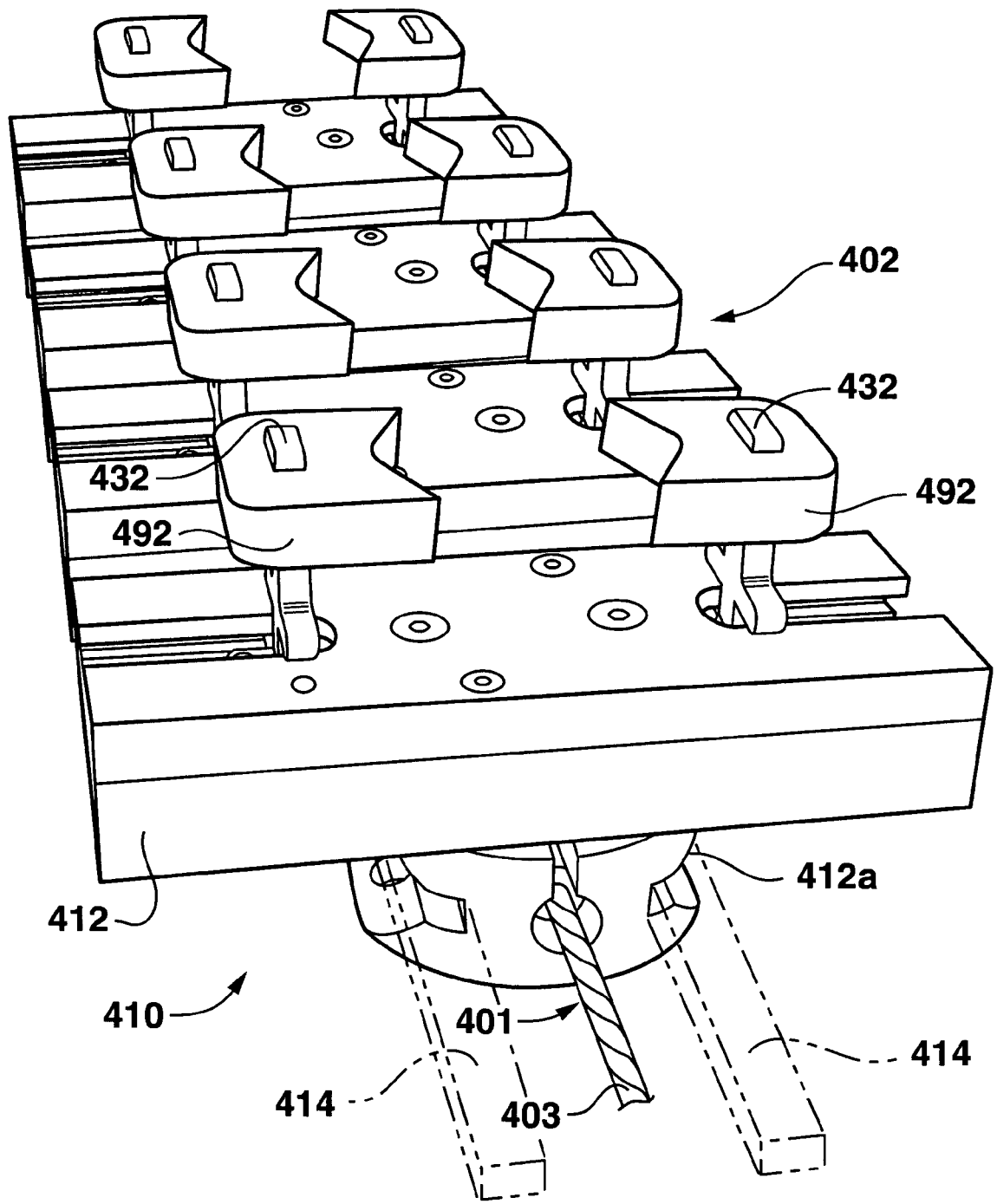
FIG. 10 is a top view of an alternate conveyor design according to certain other aspects of the present invention.
Figure 11:
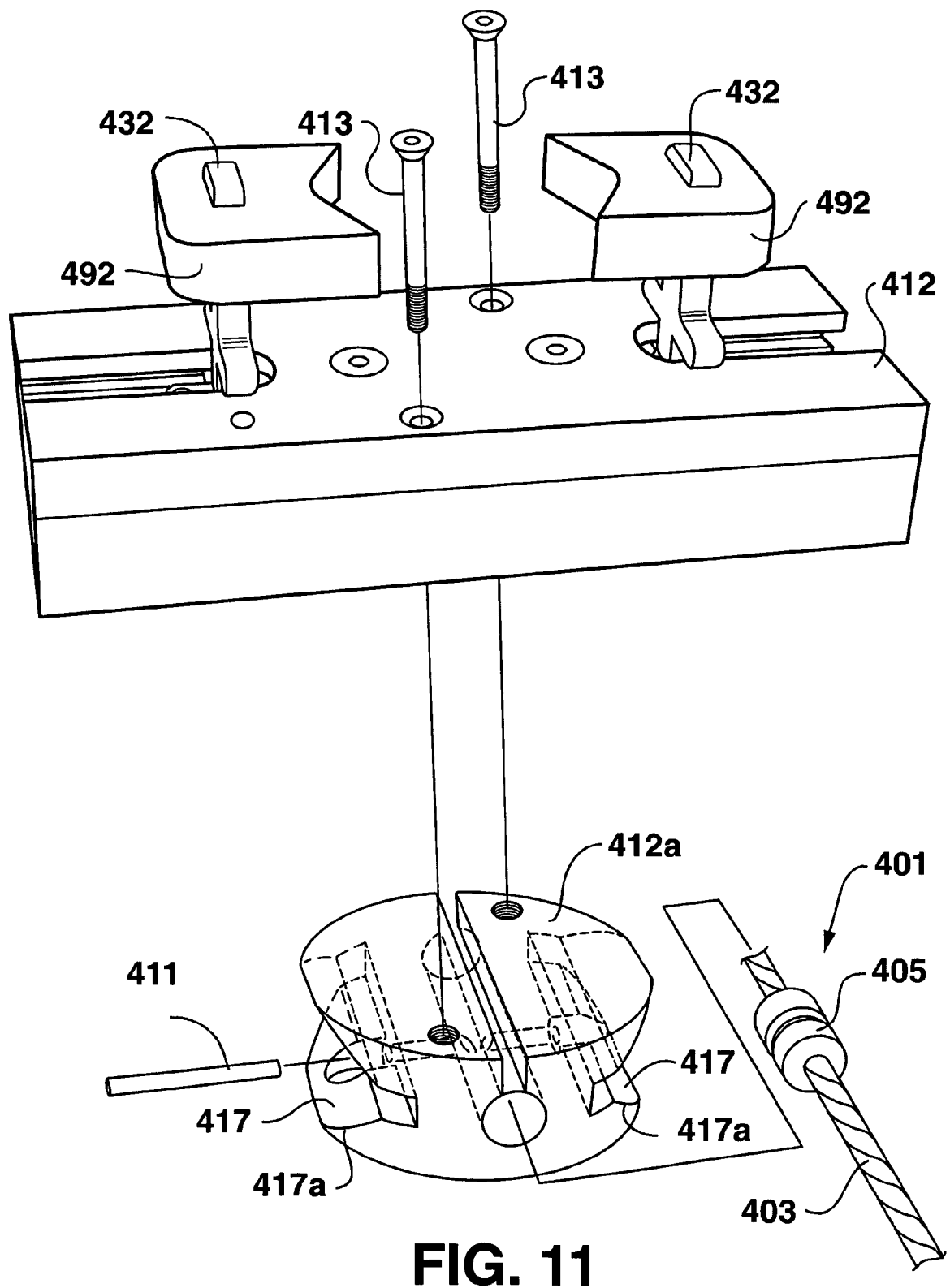
FIG. 11 is an exploded perspective view of one link of the conveyor of FIG. 10.
Figure 12:
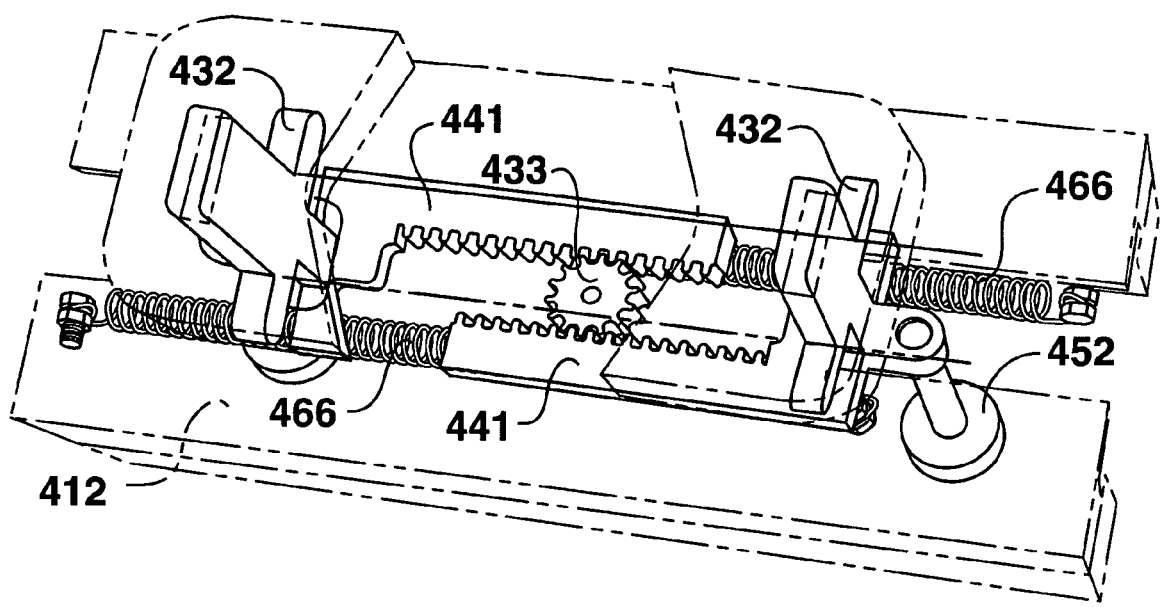
FIG. 12 is a partial perspective view of one possible internal mechanism for a link for a conveyor as in FIG. 10.

FIGS. 10–12 show an alternate gripping shuttle conveyor design. As shown, conveyor 410 may be made of shuttle elements 402, including one or more links 412, which comprise extending bodies having opposed gripping members 432 and at least one spring member 466 (see FIG. 12). At least one of gripping members 432 may move toward the other to grip a container therebetween. Gripping members 432 may include adaptors 492 configured for gripping and centering a container with respect to link 412, so as to be able to hold a container in a position and registration with an element such as a filling element, etc. Cam follower members 452 may be provided for opening gripping members 432 when desired. As shown in FIG. 12, gripping members 432 may be moved via a double rack and pinion arrangement with pinion 433 mounted for rotation relative to link 412 so as to allow racks 441 to move relative thereto in unison.

As shown herein, spring members 466 urge gripping members 432 toward a closed position. However, the function of cam followers 452 and spring members 466 may be reversed so that the cam members urge gripping members 432 toward the closed position and the spring members urge the gripping members toward the open position. Thus, gripping members may contact a conveyed object to hold the object during transport as the objects pass through a processing system, including for example a filler station or various other elements. Adjacent links 412 may be connected via connection elements such as a connecting member 401 (see FIGS. 10 and 11).

As disclosed herein, one embodiment of connecting member 401 includes a braided wire cable 403 made of stainless steel or any other suitable material, or the like with mounting members 405 secured to it at given intervals. The mounting members 405 may comprise cylindrical swages may of aluminum, stainless steel or any other suitable material or the like secured to cable 403 by a set screw, swaging, welding, braising, or any other reliable manner of attachment.

As above, the connection elements may be connected directly to the shuttle elements 402 and/or link bodies 412 or, as shown in FIGS. 10 and 11, the connection elements may be connected to an intermediate member 412a. Link bodies 412 are then connected to intermediate members 412a via screws 413, or any other method of attachment. Connecting member 401 may be connected to intermediate member 412a via a pin 411. If desired, intermediate members 412a may be removably attachable to links 412 for purposes of quick change out of conveyor 410, maintenance, replacement, cleaning, etc. Alternately, intermediate member 412a could simply comprise an extension disposed at the bottom of link 412.

As shown in FIGS. 10 and 11, intermediate members 412a may comprise substantially cylindrical pucks, and the intermediate members include structure for guiding links 412 along a track 414 comprising two rails. Intermediate members 412a in FIGS. 10 and 11 include slots 417 having flared edges 417a for guiding links 412 along track 414. Other shapes for the track and the structure for following the track are possible within the scope of the invention. Flared edges 417a allow for a certain amount of twisting if the tracks are to be inverted, for example as would be done at rinsing inverters along a container processing system.

Figure 13:
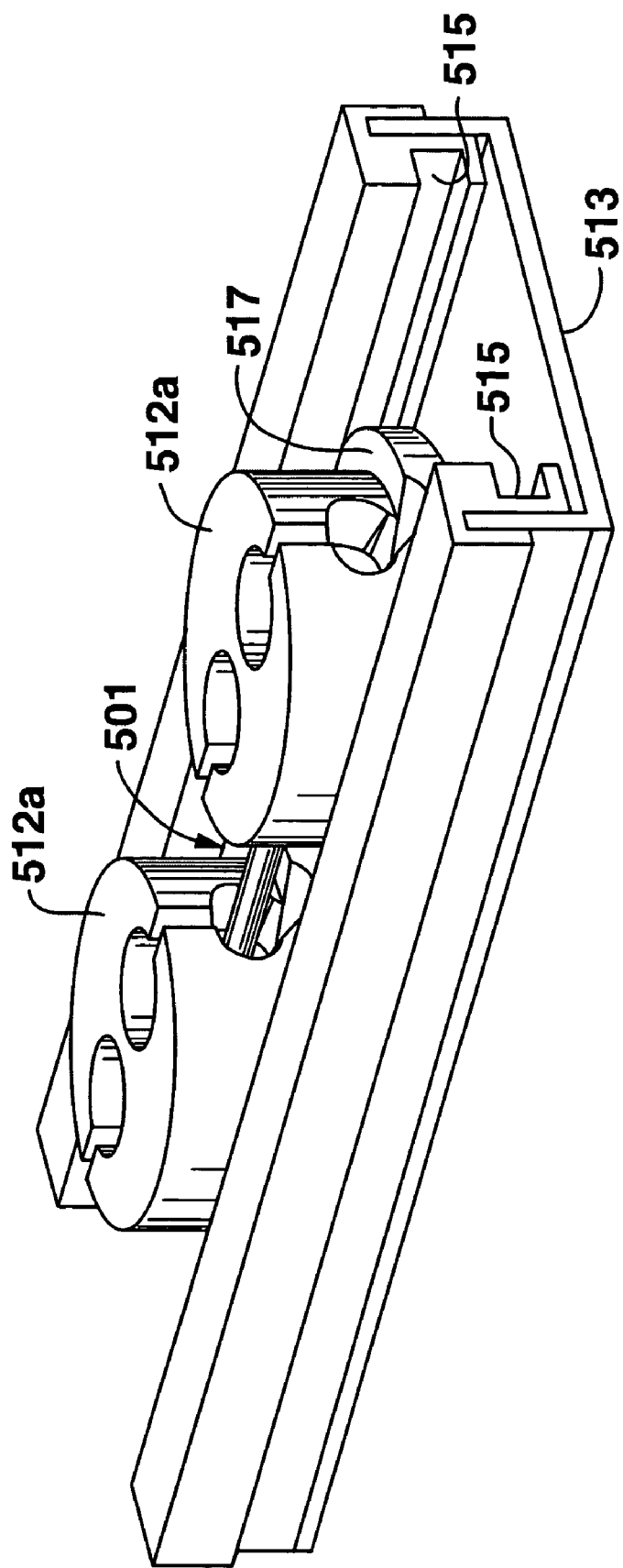
FIG. 13 is a perspective view of a portion of an alternative conveyor design according to certain aspects of the present invention.
Figure 14:
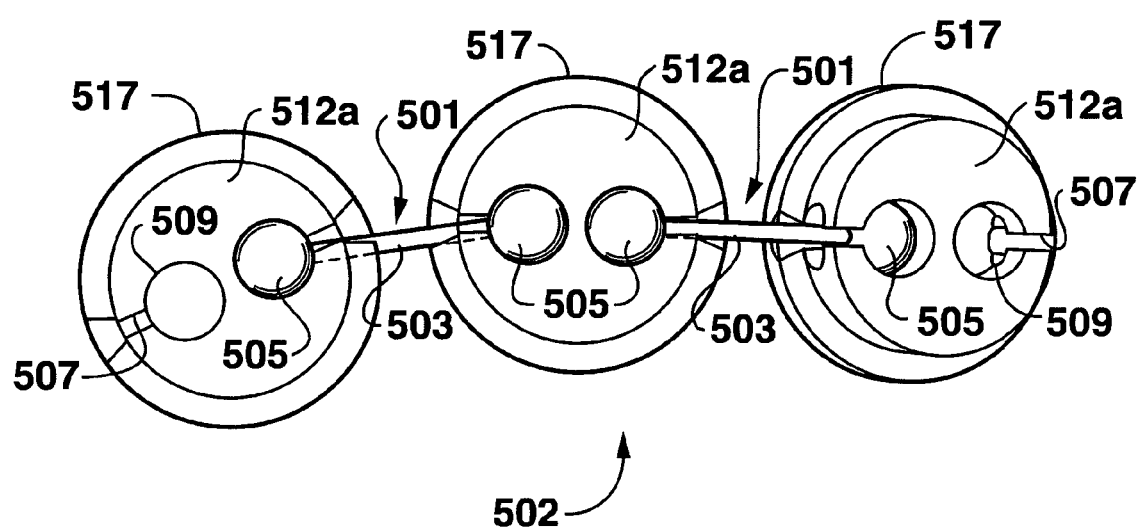
FIG. 14 is a top view of a portion of a conveyor as in FIG. 13.

FIGS. 13 and 14 show another alternate construction of a portion of a gripping shuttle conveyor. FIG. 13 shows an alternative track 513 including dual channels 515 facing each other. An alternate form of intermediate element 512a is shown having an extending flange 517 that slides within channels 515.

As shown in FIG. 14, a connection element 501 is provided for connecting adjacent intermediate elements 512a into a shuttle element 502. Links (not shown), such as any of the links discussed above, may be attached in various ways to intermediate elements 512a to form the shuttle element. Connection element 501 comprises a barbell shaped element having a center rod 503 and two larger end pieces 505. End pieces 505 comprise spherical members that are seated within openings 509 in intermediate elements 512a. Slots 507 extending from openings 509 allow for assembly and a certain amount of play between adjacent intermediate elements 512a to provide for three-dimensional movement between adjacent intermediate elements 512a, as discussed above. Barbell 501 may be made of a metal, such as a stainless steel, and the intermediate element 512a may be made of a plastic, such as celcon, or the like, although other materials are possible.

FIG. 15 shows another alternate construction of a portion of a gripping shuttle conveyor 610. As shown, shuttle elements 602 and 602' are independently movable along track 613. Drive mechanisms are provided in the form of wheels 625 that contact an outer portion of shuttle elements 602 to drive them in a selected direction. Track 613 has a T-shaped cross section and intermediate elements 612a having a channel-shaped cross section slide along track 613.

Intermediate elements 612a are attached to an overmold 630 formed over a plurality of pivotally connected gripping members 632. Objects may be gripped between gripping members 632 and conveyed as desired. A tensioning member 666 may be provided for urging the gripping members 632 toward each other. As shown, tensioning member 666 comprises a sealed, cylindrical bladder disposed between an opposite gripping member 632. External pressure on gripping member 632 in the region of bladder 666 deforms the bladder allowing the gripping members to pivot, thereby opening the gripping ends of gripping member 632. The gripping members may be manipulated by camming functions, rotatable wheels, rails, etc. Gripping members 632 may be formed of a metal, plastic, or other somewhat rigid material, and the overmold 630 may be formed of a plastic such as Alcryn, available from Advanced Polymer Alloys, or a rubber, a silicone, etc. Wheel 625 and/or shuttle elements 602 may include an outer coating or texture to assist in gripping and moving shuttle elements 602, as desired.

Figure 16:
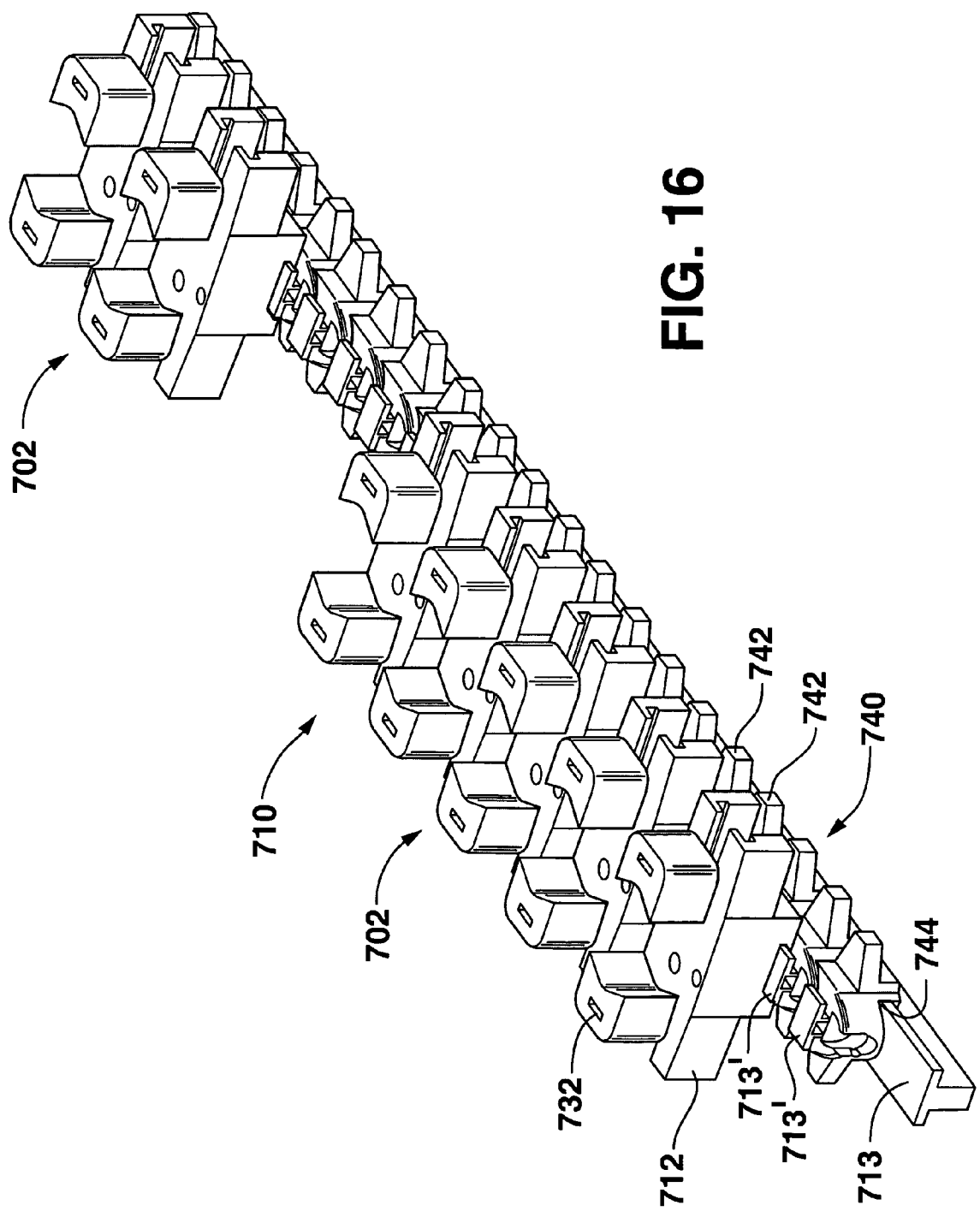
FIG. 16 is a perspective view of a portion of another conveyor according to certain other aspects of the invention.

FIG. 16 shows another alternative conveyor 710 incorporating certain concepts from the above conveyors. As shown, a track 713 having a T-shaped cross section is provided along with a plurality of shuttle elements 702 comprising a number of links 712 having movable gripping members 732. Links 712 are mounted by way of an intermediate track 713' to an intermediate conveyor 740 comprising an endless conveyor. As shown, conveyor 740 includes a plurality of links 742 configured for intermeshing with a toothed drive wheel, such as wheel 125 of FIG. 1. Conveyor 740 may be driven at a constant speed along track 713. Links 742 of conveyor 740 are joined by a ball and socket arrangement to allow for three-dimensional movement between links. Track 713' may have various configurations. As shown, track 713' includes a T-shaped cross section and mates with a similar channel 744 found in links 712 of shuttle element 702.

The material properties for tracks 713 and 713', conveyor 740, and shuttle elements 702 should be selected so that, under normal conditions, shuttle element 702 is driven via conveyor 740. However, if shuttle element 702 contacts another element along the way, it will stop and readily slide relative to conveyor 740. Also, shuttle element 702 may slide at a different speed than conveyor 740, depending on operations ongoing within the overall system. Thus, as shown in FIG. 16, shuttle elements 702 are not directly driven by the drive mechanism; instead, shuttle elements 702 are pulled along by intermediate conveyor 740 unless acted upon by an outside object. Such an orientation can be retrofit onto an existing conveyor, such as conveyor 740 or a knuckle conveyor by adding members including track 713' and shuttle elements 702 to the system.

Figure 17:
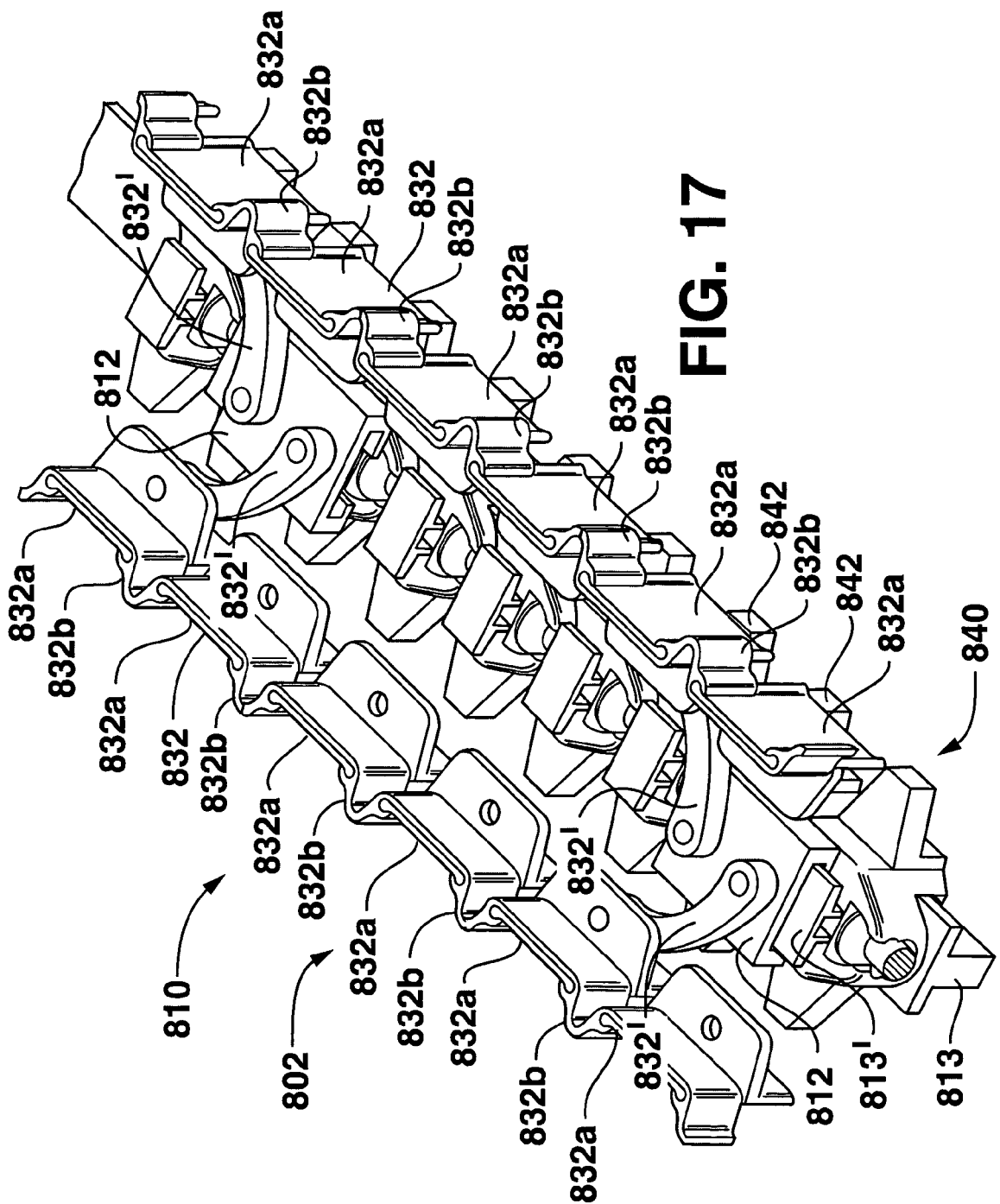
FIG. 17 is a perspective view of a portion of another conveyor according to certain other aspects of the invention.

FIG. 17 shows yet another alternate configuration for a conveyor 810 according to certain other aspects of the invention. As shown, conveyor 810 includes a dual track design, with track 813 guiding endless conveyor 840, which is substantially similar to conveyor 740 discussed above. Shuttle elements 802 differ from shuttle elements 702, however. For example, shuttle elements 802 include only two links 812 following track 813' over an area spanning several links 842 of intermediate conveyor 840. Each link 812 is attached to two gripping members 832 extending along opposite sides of track 813. Gripping member 832 may include solid portions 832a, made for example of metal or plastic, and flexible portions 832b, made for example of rubber or silicon, or an elastomer. Thus, gripping members 832 may flex along their lengths. Linkages 832' extend from links 812 to gripping members 832. Gripping members 832 may be positioned via cams, rails, etc., or may be spring-loaded, either to a gripping or to an open position, as desired for a particular application. Camming members or rails may be disposed in various locations, including the lower ends of portions 832a. As with conveyor 710, links 812 are frictionally engaged with track 813' so as to be driven via movement of conveyor 840 unless and until acted upon by an outside force or object. More than two links 812 and/or additional linkages 832' may also be used for each shuttle element. Gripping members 832 of FIG. 17 may be used to grip a group of objects or a lengthy object if desired.

Figure 18:
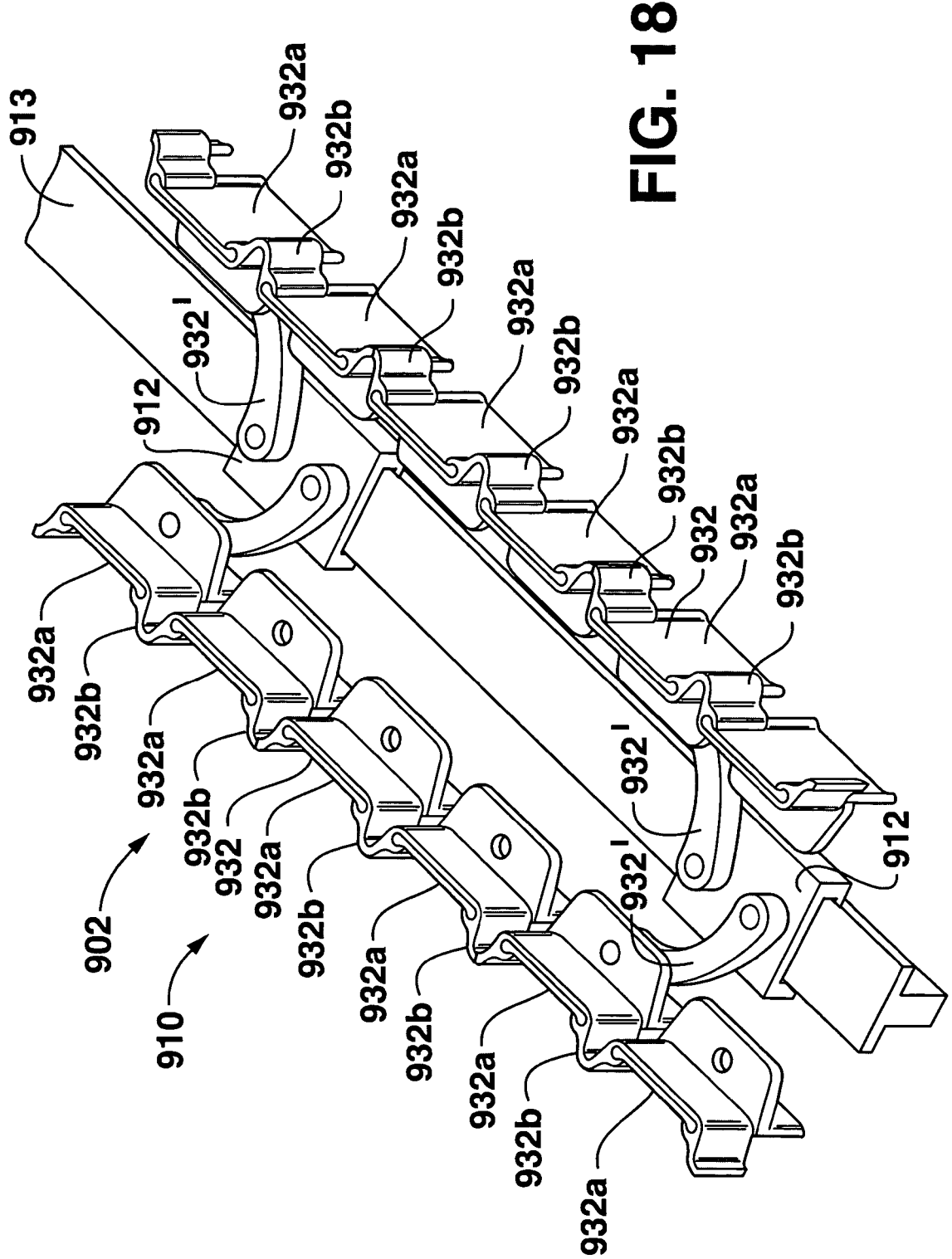
FIG. 18 is a perspective view of a portion of another conveyor according to certain other aspects of the invention.

FIG. 18 shows an alternate design for a conveyor 910 in which the intermediate conveyor of FIG. 17 has been eliminated. Thus, shuttle element 902 includes links 912 traveling on track 913. Shuttle element 902 also includes extending gripping members 932 joined to links 912 via linkages 932'. The various modifications discussed above with respect to FIG. 17 are possible for conveyor 910 as well. It would be possible to use only one extending (modified) link with the designs of FIGS. 16–18, if desired.

The conveyors and links of FIGS. 1–18 have particular usefulness in picking up and moving objects including containers, either by their necks or their bases. The objects can be inverted, if desired, to pass them through a rinser or a labeler, or to allow them to drain. Moving lightweight plastic containers is also reliably performed, as the bottles are securely gripped during travel. Tipping over of such lightweight containers is not an issue when the containers are gripped from above. Therefore, it is possible in some applications to move the conveyed objects very rapidly.

It should be understood that designs for the gripping elements and conveyors such as those disclosed in U.S. patent applications Ser. Nos. 10/712,405, 10/712,406, and 10/712,407, all filed Nov. 13, 2003; U.S. patent application Ser. No. 10/806,806, filed Mar. 30, 2004; U.S. patent application Ser. No. 10/847,214, filed May 17, 2004; and U.S. patent application Ser. No. 10/879,690, filed Jun. 29, 2004, all assigned to the owner of the present application and incorporated by reference herein, could also be used or adapted if desired. Thus, the teachings of these patent applications may be incorporated into the present application to achieve variations in shuttle gripping conveyor designs.

The conveyors, including tracks and shuttle elements, of FIGS. 1–18 may be made of conventional materials such as metals, plastics, and elastomers, as are known in the conveying arts. If desired, stoppers or spacers may be attached to ends of shuttle elements to protect or space the shuttle elements from each other and/or to protect the conveyed articles. It should be understood that the present invention could be practiced using a track filled with shuttle elements or a track having a greater length than the collective length of the shuttle elements. Further, gaps may exist between shuttle elements in either or both of the conveying portion and/or return portion of the conveyor path. Also, the shuttle elements may be driven relatively faster along a portion of either the conveying or return portion, and/or may change speeds along either or both portions, as desired, all dependent upon the particular application.

If desired, the conveyor may drive the shuttle elements using a plurality of drive mechanisms so that speeds may be modulated along the conveyor path. Thus, the conveyor may be driven so as to operate in an "accumulator mode," in which a ready supply of shuttle elements is provided along the conveying portion, drivable at relatively fast or slow speeds, or stoppable, so as to achieve desired inflow and outflow. Also, the shuttle elements along the conveying portion can be driven relatively faster than along the return portion in such accumulator mode, or at conveyor start up. One skilled in the art can therefore adapt the disclosed shuttle element conveyors to suit many conveying applications, optionally using conventional sensors and programmable logic controllers and other related control equipment, all within the scope of the present invention. In such applications, the shuttle elements need not include gripping members, according to certain aspects of the invention.

The conveyors and links of FIGS. 1–18 may be modified in various ways to incorporate teachings of the embodiments of other embodiments within FIGS. 1–8. It should be understood that various other modifications and combinations of the above embodiments are contemplated and are also within the scope of the present invention. For example, spring members shown as compression springs could be substituted with tension springs, and vice versa, with corresponding modifications of other related elements. In such cases, movement of cam followers and cams from one side of a link to the other may be required, among other changes. Also, each link may include only one or multiple gripping members. Each gripping member may include only one or multiple gripping arms. Multiple gripping arms may be actuated by a single slider on a link, or each gripping arms may be actuated by a single slider on a link, or each gripping arm may have its own slider. The shape of the link body, the method of attachment to the drive mechanism, the type of drive mechanism, and the disclosed uses of the conveyors herein are also examples only, and no limitations should be drawn from this disclosure. Thus, the present invention contemplates that any and all such subject matter is included within the scope of the present invention.

What is claimed is:

1. A gripping shuttle conveyor suitable for conveying objects along a transport direction, the gripping shuttle conveyor comprising:
    a track extending along a conveying path following the transport direction; and
    a plurality of shuttle elements independently movable along the track, each shuttle element including a plurality of connected links, each link having a length extending across the direction of transport and a width extending along the direction of transport, each link having a conveying surface for conveying one or more of the objects and each link defining mating structure for following the track along the conveying path, each shuttle element including at least two movable gripping members for selectively gripping conveyed objects, the two movable gripping members being disposed adjacent each other along the transport direction.

2. The gripping shuttle conveyor of claim 1, wherein each link has at least one of the gripping members.

3. The gripping shuttle conveyor of claim 1, wherein each link has two of the gripping members.

4. The gripping shuttle conveyor of claim 3, wherein each shuttle element includes two additional gripping members disposed opposite the two movable gripping members across the direction of transport.

5. The gripping shuttle conveyor of claim 1, further including a drive mechanism for moving the shuttle elements along the track.

6. The gripping shuttle conveyor of claim 5, wherein the drive mechanism drives the links directly.

7. The gripping shuttle conveyor of claim 5, further including an intermediate conveyor configured to slide along the track and having an intermediate track, the shuttle elements configured to slide along the intermediate track, the drive mechanism driving the intermediate conveyor along the track.

8. The gripping shuttle conveyor of claim 7, wherein the intermediate conveyor and the shuttle elements are configured so that the shuffle elements are frictionally driven by the intermediate conveyor.

9. The gripping shuttle conveyor of claim 1, wherein each shuttle element has at least one gripping member extending adjacent along more than one of the respective plurality of links of the shuttle element.

10. The gripping shuttle conveyor of claim 1, wherein each shuttle element includes connecting elements to connect the plurality of links within the shuttle element.

11. The gripping shuttle conveyor of claim 10, wherein the connecting elements include one of a cable, a rod, a ball and socket joint, or an overmold.

12. The gripping shuttle conveyor of claim 1, wherein the track defines bends followed by the shuttle elements.

13. The gripping shuttle conveyor of claim 1, wherein the track comprises one of a T-shaped cross-section, opposed rails, or channels.

14. The gripping shuttle conveyor of claim 1, further including a plurality of drive mechanisms disposed along the track for moving the shuttle elements along the track, the shuttle elements being pushed to a given drive mechanism via force provided by an upstream drive mechanism.

15. The gripping shuttle conveyor of claim 14, wherein a first portion of the drive mechanisms are disposed along a conveying portion of the track and a second portion of the drive mechanisms are disposed along a return portion of the track.

16. The gripping shuttle conveyor of claim 15, wherein the drive mechanisms cause the shuttle elements to move along at least a portion of the return portion faster than along the conveying portion.

17. The gripping shuttle conveyor of claim 14, wherein the drive mechanisms are independently controllable to selectively modulate flow of shuttle elements along the track.

18. The gripping shuttle conveyor of claim 14, wherein the drive mechanisms are independently controllable so as to operate the conveyor in an accumulator mode.

19. The gripping shuttle conveyor of claim 1, wherein the shuttle elements define a collective length less than a length of the track.

20. The gripping shuttle conveyor of claim 19, wherein the shuttle elements define a collective length at least about 20 percent less than a length of the track.

21. The gripping shuttle conveyor of claim 19, wherein the shuttle elements define a collective length from about 50 to about 80 percent of a length of the track.

22. A gripping shuttle conveyor suitable for conveying objects along a transport direction, the gripping shuttle conveyor comprising:
    a track extending along a conveying path following the transport direction, the track defining a length;
    a plurality of shuttle elements independently movable along the track, each shuttle element defining mating structure for following the track along the conveying path, each shuttle element including at least two movable gripping members for selectively gripping conveyed objects, the two movable gripping members being disposed adjacent each other along the transport direction, the shuttle elements defining a collective length less than the length of the track; and a drive mechanism for moving the shuttle elements along the track.

23. The gripping shuttle conveyor of claim 22, wherein each shuttle element includes two additional gripping members disposed opposite the two movable gripping members across a direction of transport.

24. The gripping shuttle conveyor of claim 22, wherein the drive mechanism drives the shuttle elements directly.

25. The gripping shuttle conveyor of claim 22, further including an intermediate conveyor configured to slide along the track and having an intermediate track, the shuttle elements configured to slide along the intermediate track, the drive mechanism driving the intermediate conveyor along the track.

26. The gripping shuttle conveyor of claim 25, wherein the intermediate conveyor and the shuttle elements are configured so that the shuttle elements are frictionally driven by the intermediate conveyor.

27. The gripping shuttle conveyor of claim 22, wherein the shuttle elements define a collective length at least about 20 percent less than a length of the track.

28. The gripping shuttle conveyor of claim 22, wherein the shuttle elements define a collective length from about 50 to about 80 percent of a length of the track.

29. The gripping shuttle conveyor of claim 22, wherein the shuttle elements include a deformable bladder for manipulating the gripping member.

30. The gripping shuttle conveyor of claim 22, further including a plurality of drive mechanisms disposed along the track for moving the shuttle elements along the track, the shuttle elements being pushed to a given drive mechanism via force provided by an upstream drive mechanism.

31. The gripping shuttle conveyor of claim 30, wherein a first portion of the drive mechanisms are disposed along a conveying portion of the track and a second portion of the drive mechanisms are disposed along a return portion of the track.

32. The gripping shuttle conveyor of claim 31, wherein the drive mechanisms cause the shuttle elements to move along at least a portion of the return portion faster than along the conveying portion.

33. The gripping shuttle conveyor of claim 30, wherein the drive mechanisms are independently controllable to selectively modulate flow of shuttle elements along the track.

34. The gripping shuttle conveyor of claim 30, wherein the drive mechanisms are independently controllable so as to operate the conveyor in an accumulator mode.

35. A gripping shuttle conveyor suitable for conveying objects along a transport direction, the gripping shuttle conveyor comprising:

a track extending along a conveying path following the transport direction, the track defining a length and having a conveying portion and a return portion;

a plurality of shuttle elements independently movable along the track, each shuttle element defining mating structure for following the track along the conveying path, each shuttle element including at least two movable gripping members for selectively gripping conveyed objects, the two movable gripping members being disposed adjacent each other along the transport direction, along the conveying portion, the shuttle elements defining a collective length less than the length of the track; and a drive mechanism for driving the shuttle elements faster along at least a portion of the return portion of the track than along the conveying portion of the track.

36. The gripping shuttle conveyor of claim 35, wherein the shuttle elements define a collective length at least about 20 percent less than a length of the track.

37. The gripping shuttle conveyor of claim 35, wherein the shuttle elements define a collective length from about 50 to about 80 percent of a length of the track.

38. The gripping shuttle conveyor of claim 35, wherein the drive mechanism drives the links directly.

39. The gripping shuttle conveyor of claim 35, further including an intermediate conveyor configured to slide along the track and having an intermediate track, the shuttle elements configured to slide along the intermediate track, the drive mechanism driving the intermediate conveyor along the track.

40. The gripping shuttle conveyor of claim 39, wherein the intermediate conveyor and the shuttle elements are configured so that the shuttle elements are frictionally driven by the intermediate conveyor.

41. The gripping shuttle conveyor of claim 35, wherein each shuttle element includes connecting elements to connect the plurality of links within the shuttle element.

42. The gripping shuttle conveyor of claim 41 wherein the connecting elements include one of a cable, a rod, a ball and socket joint, or an overmold.

43. A shuttle conveyor suitable for conveying objects along a transport direction, the shuttle conveyor comprising:

a track extending along a conveying path following the transport direction, the track defining a length and having a conveying portion and a return portion;

a plurality of shuttle elements independently movable along the track, each shuffle element defining mating structure for following the track along the conveying path, the shuttle elements conveying objects along the conveying portion, the shuttle elements defining a collective length less than the length of the track, each shuttle element including at least two movable gripping members for selectively gripping conveyed objects, the two movable gripping members being disposed adjacent each other along the transport direction; and a drive mechanism for driving the shuttle elements so as to selectively modulate the flow of the shuttle elements along the track.

44. The shuttle conveyor of claim 43, wherein the drive mechanism drives at least some of the shuttle elements faster at conveyor start up than during later operation.

45. The shuttle conveyor of claim 43, wherein the drive mechanism drives the shuttle elements so that the conveyor operates in an accumulator mode.

46. The shuttle conveyor of claim 43, wherein the shuttle elements define a collective length at least about 20 percent less than a length of the track.

47. The shuttle conveyor of claim 43, wherein the shuttle elements define a collective length from about 50 to about 80 percent of a length of the track.

* * * * *